June 6, 1939.  W. F. GROENE ET AL  2,161,545
LATHE TRANSMISSION AND THE LIKE
Filed June 10, 1936  15 Sheets-Sheet 11
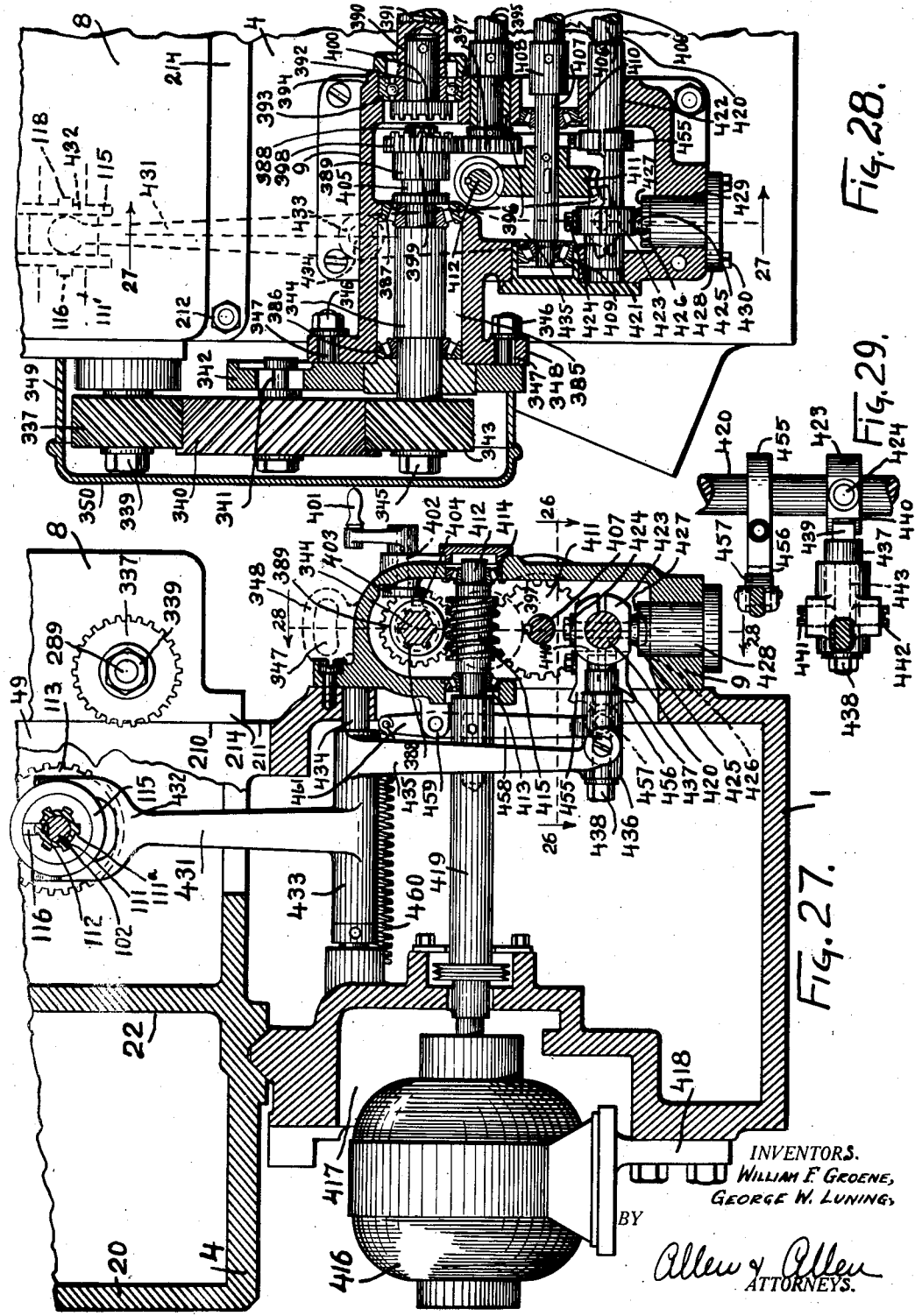
INVENTORS.
WILLIAM F. GROENE,
GEORGE W. LUNING,
BY
Allen & Allen
ATTORNEYS.

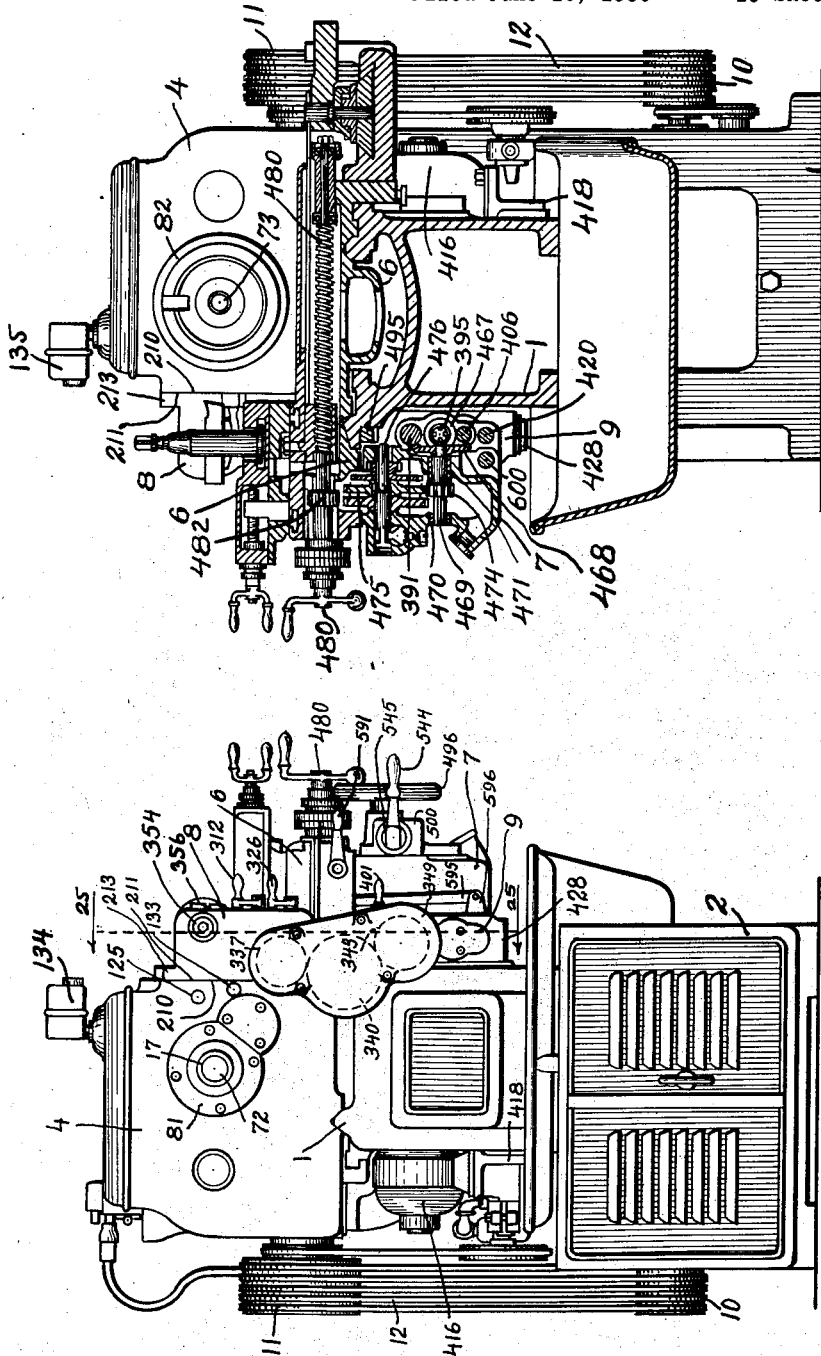

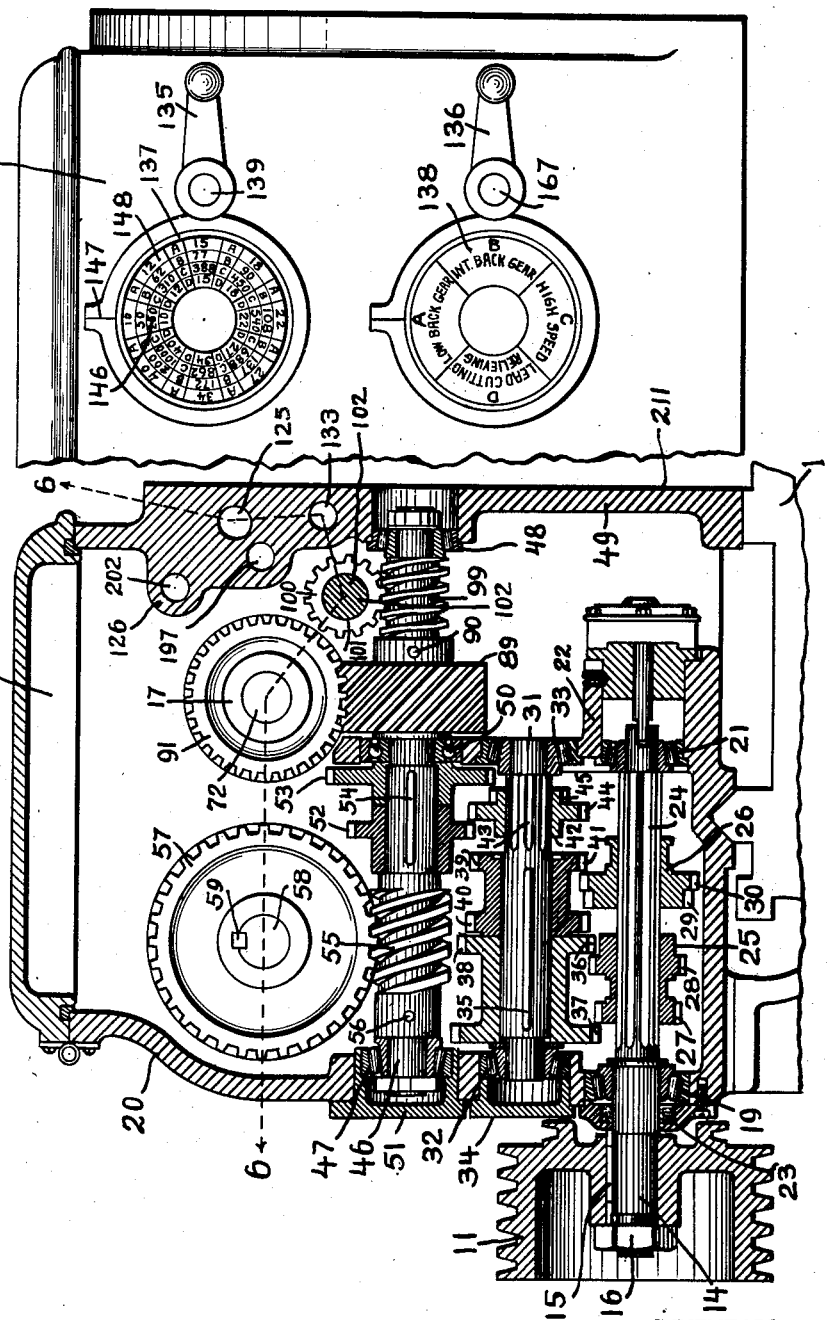

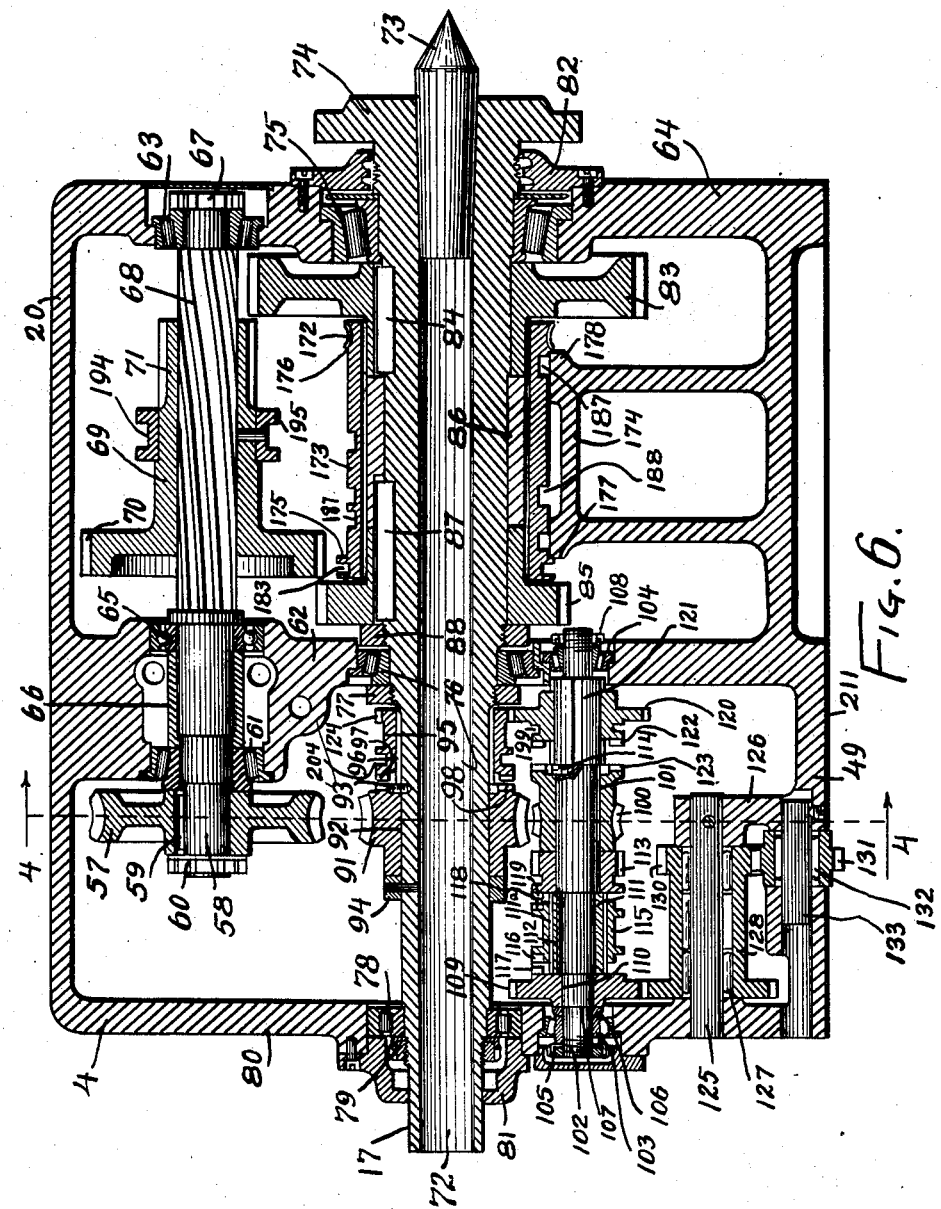

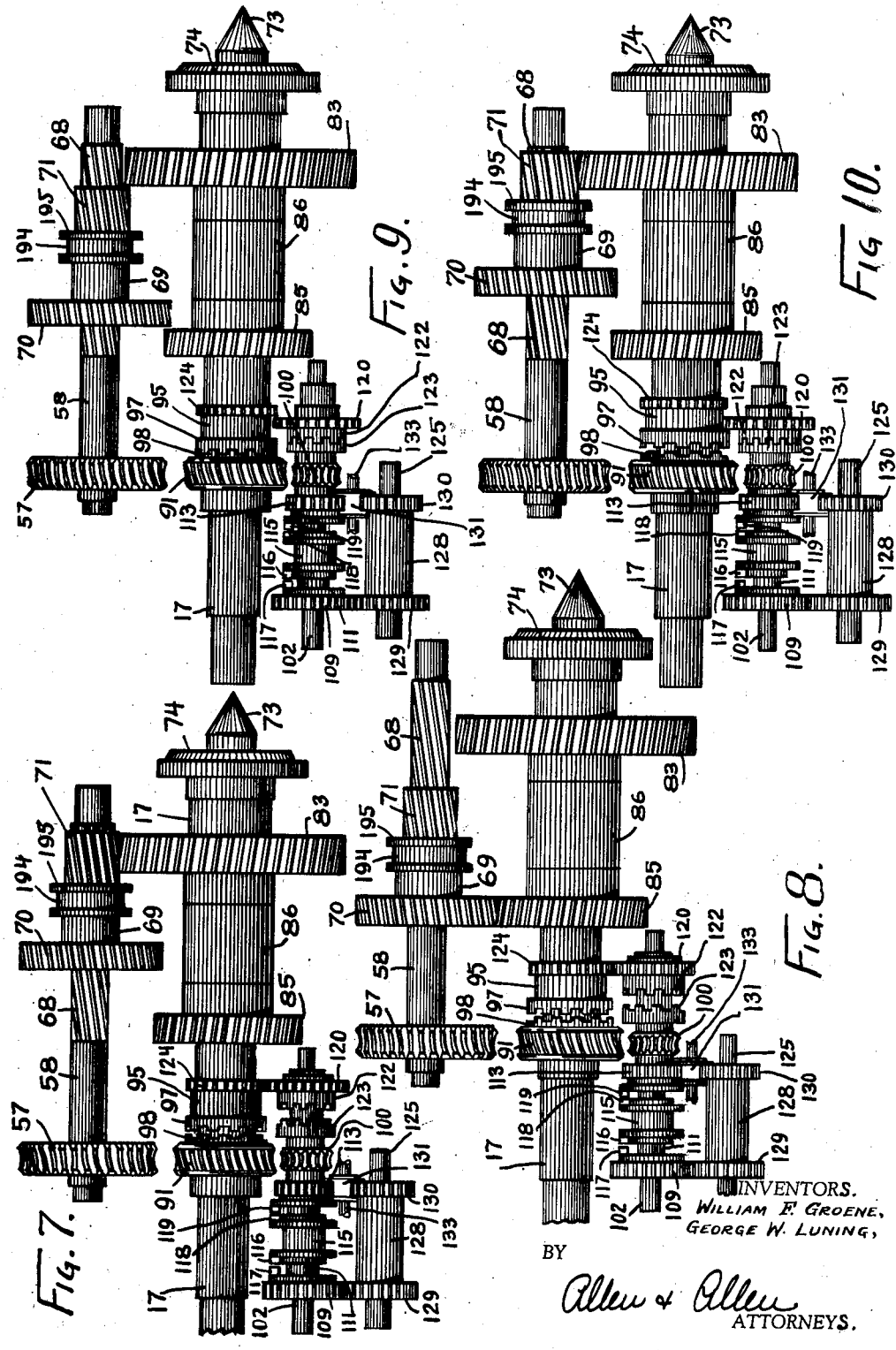

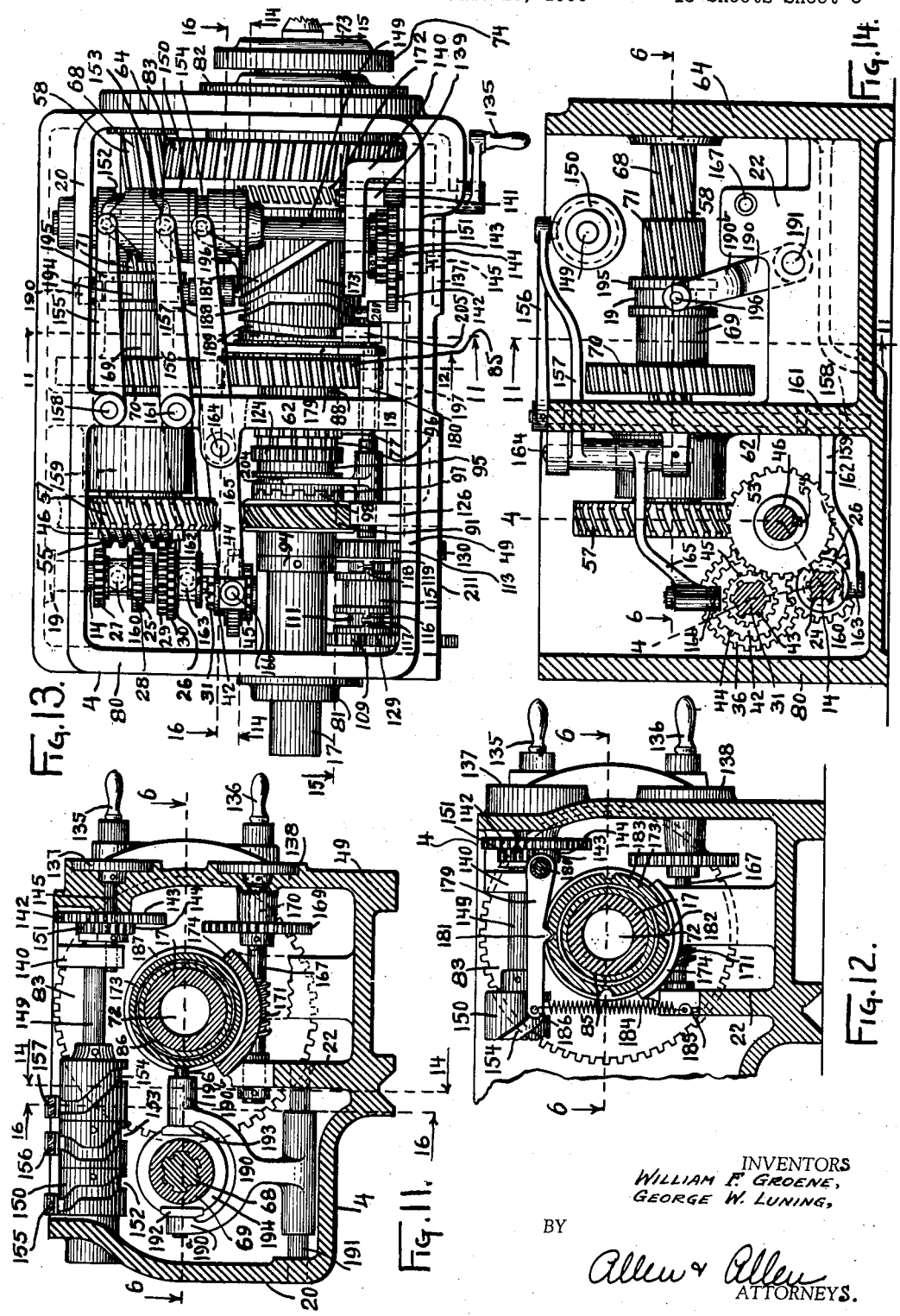

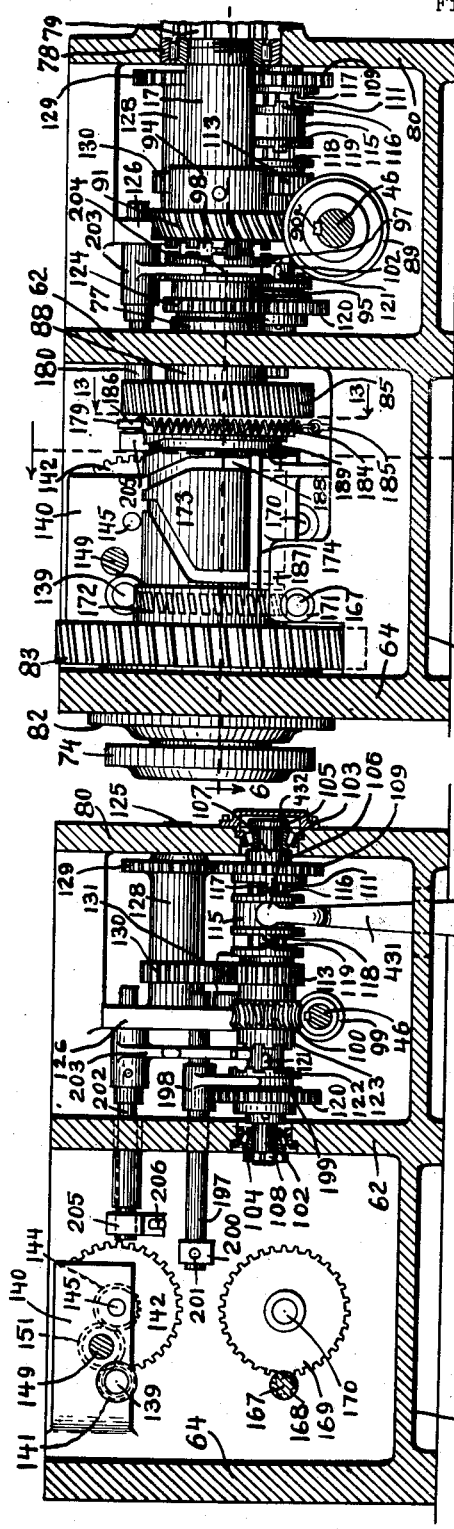

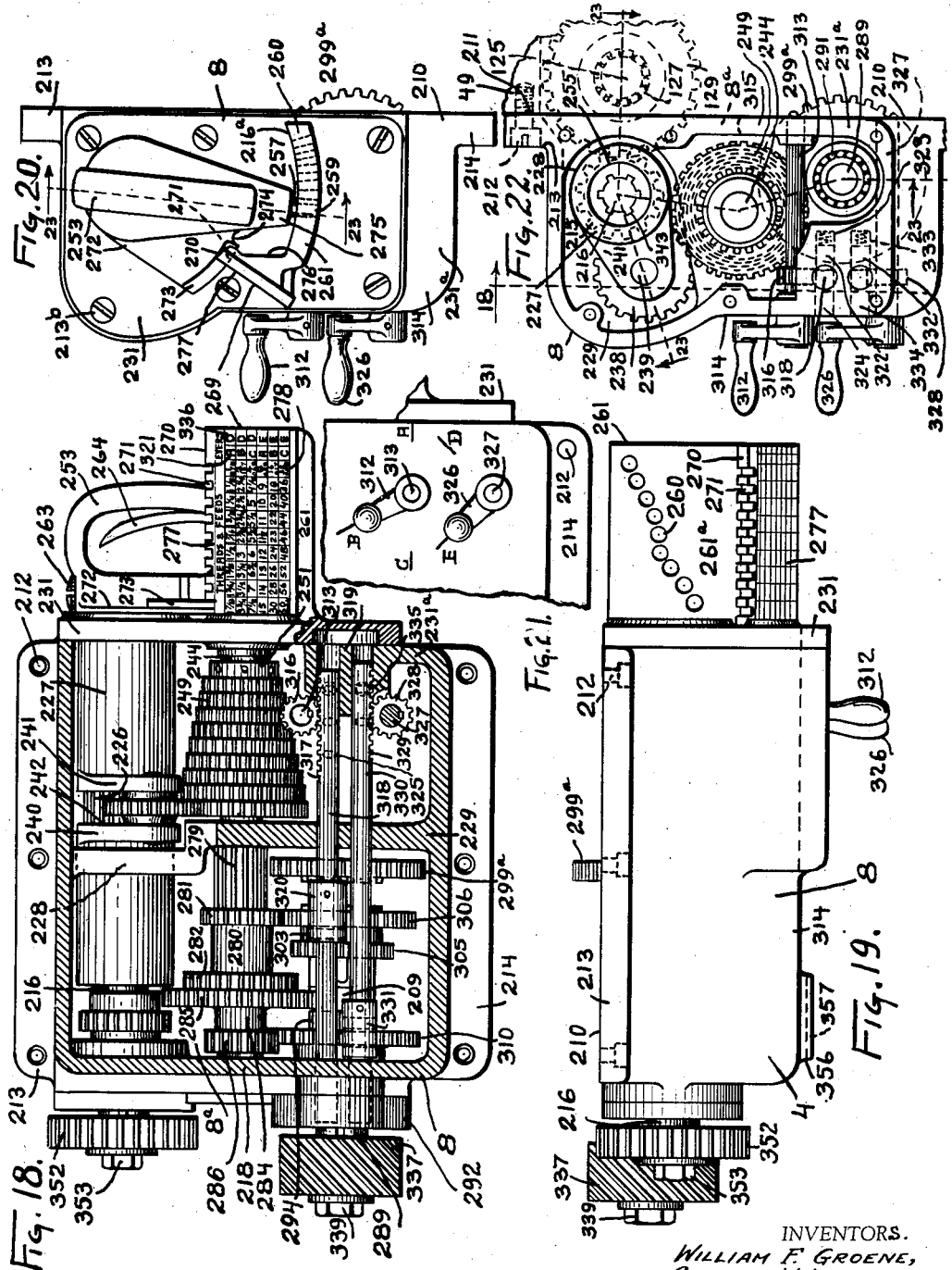

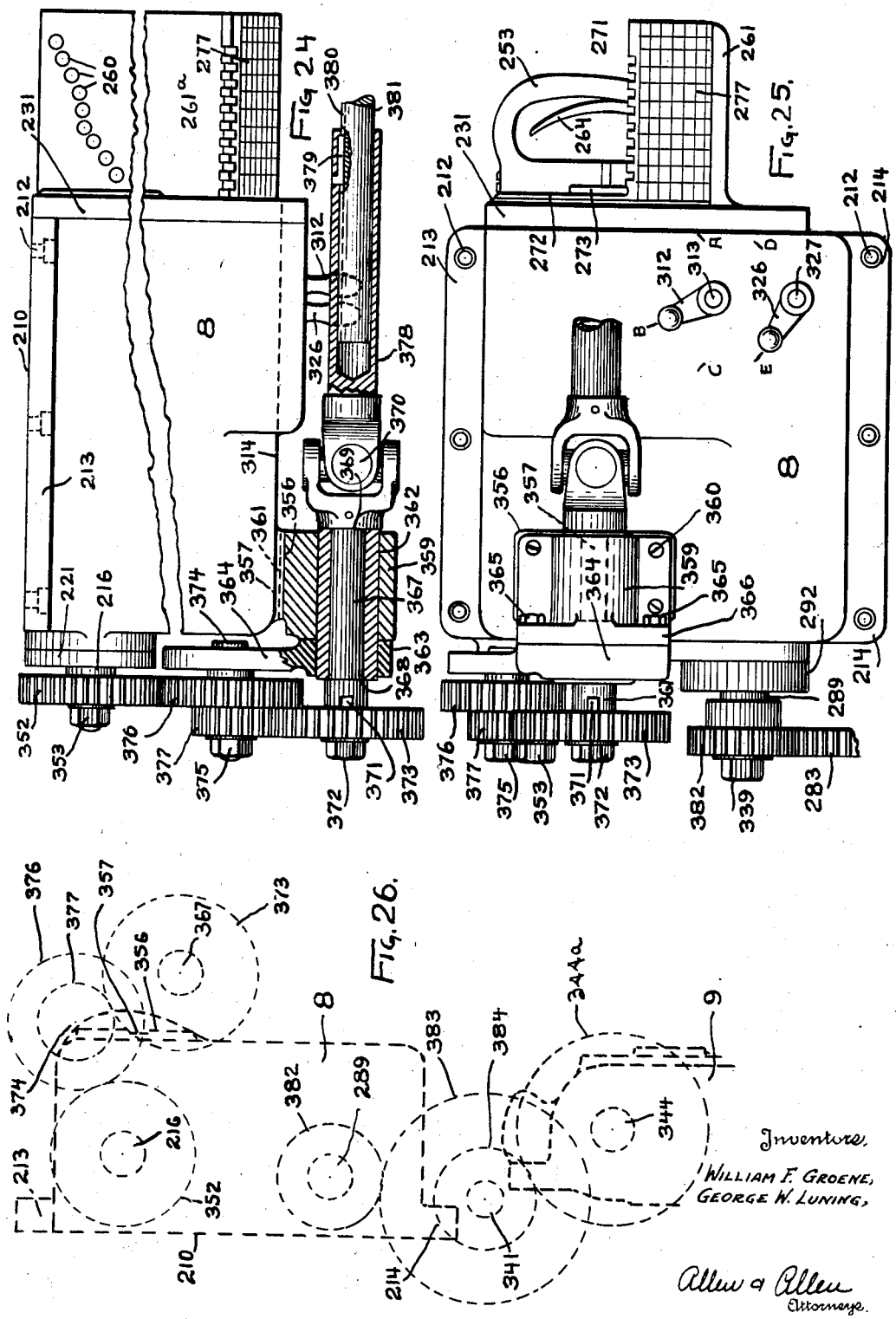

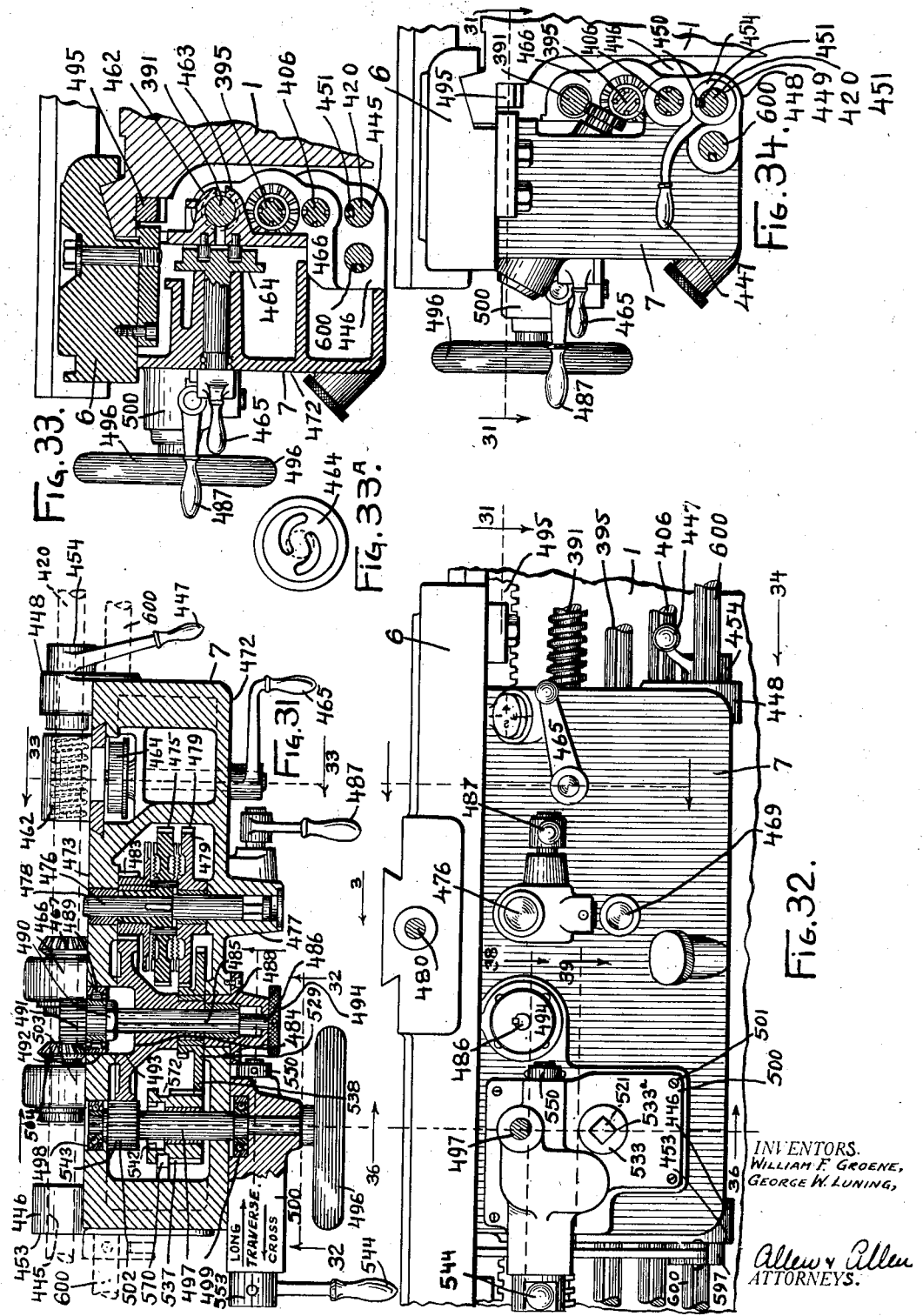

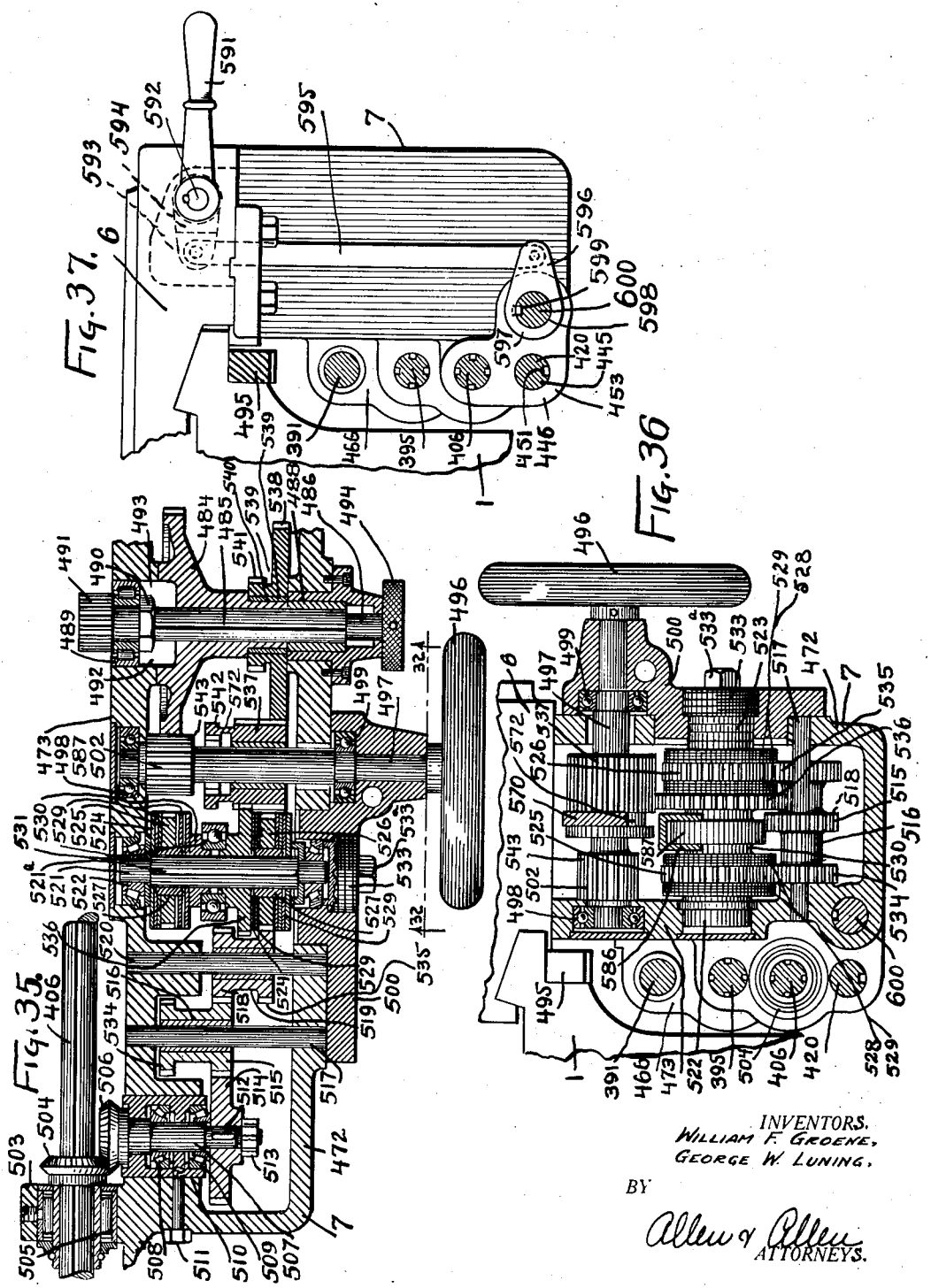

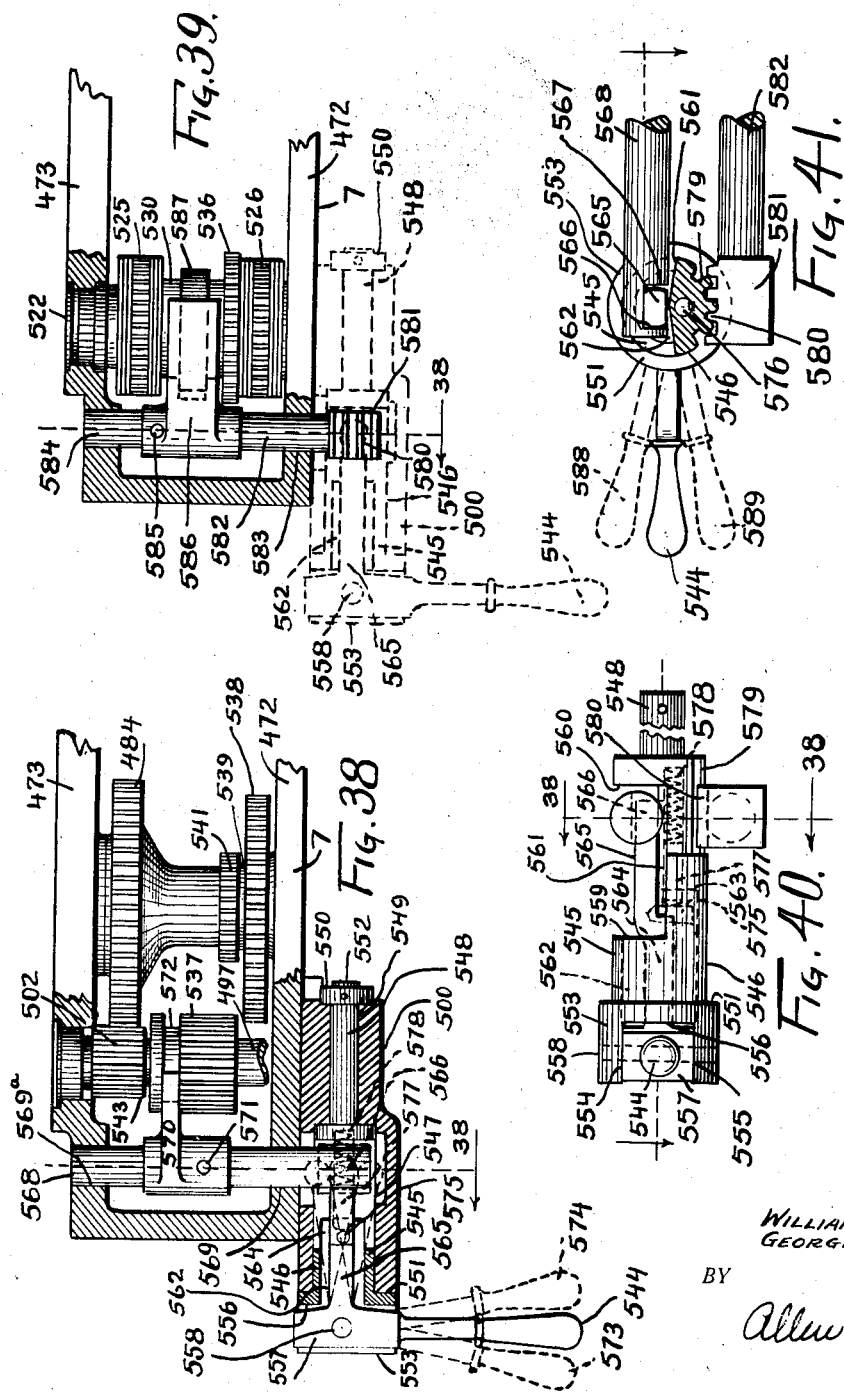

Patented June 6, 1939

2,161,545

UNITED STATES PATENT OFFICE 2,161,545

LATHE TRANSMISSION AND THE LIKE

William F. Groene and George W. Luning, Cincinnati, Ohio, assignors to The R. K. LeBlond Machine Tool Company, Cincinnati, Ohio, a corporation of Delaware Application June 10, 1936, Serial No. 84,500

28 Claims. (Cl. 82—2)

Our invention pertains to machine tools and more particularly to a class of machine tools known as engine lathes. Specifically, the type of lathe to which we have shown our invention applied for illustrative purposes is known as a toolroom lathe.

With the introduction of high speed carbide tools, radical changes have become necessary in the driving equipment and control for machines of this and comparable types, particularly in the transmission for driving the spindle and feed mechanism for developing high speeds. Moreover, there has been a greater necessity for a wider speed range for the spindle together with a wider range of feeds usable throughout the entire wide speed range.

To take the conventional headstock transmission and speed it up does not solve the problem of a wide speed range because the high gear speed causes objectionable noise and vibration. Also, with this arrangement the low speeds necessary for many types of work are then too fast. This procedure also speeds up the feed transmission mechanism to a point where it is noisy and produces feeds which are too coarse for use in connection with high spindle speeds.

We have overcome these difficulties by providing an adequate speed range in a machine for all ranges of work and types of cutting tools which might be encountered.

One object of our invention is to provide a headstock transmission, adapted to the complete range of speeds, which can produce the slow speeds necessary when using a relieving attachment, or when doing large diameter work or chasing very coarse lead threads, without the necessity of a sub-head or any additional supplementary gears in the feed transmission.

Another object is to provide a headstock transmission of wide speed range in which the surface speed of the gears is relatively low and in which the driven gears are all equal to or of greater diameter than the driving gears.

In order to promote smooth and quiet operation of the transmission all of the higher speeds are obtained through worm drive, all gearing for the lower speeds being disengaged and in neutral position during high speed operation.

Another object is to provide a headstock transmission in which the back gear drive is initially driven through a worm drive.

Another object is to provide a worm drive to the feed mechanism during operation of the headstock at the higher speeds.

Another object is to provide a direct drive from the spindle to the feed mechanism during operation at the lower speeds.

It is also an object of this invention to provide in combination in a headstock transmission, a worm drive to the back gear shaft, a worm drive directly to the spindle, and a worm drive for the feed drive mechanism in conjunction with simplified means for properly engaging these various drive mechanisms.

It is also our invention to provide in a headstock transmission of wide speed range, means whereby the driving power to the feeding mechanism may be reversed at any speed throughout the entire speed range of the transmission without in any way causing damage to the lathe.

Another object is to provide an arrangement whereby the feeding mechanism remains at normal speeds during the high speed operation thereby giving fine feeds with high speeds, a very important requisite to the efficient use of high speed carbide cutting tools.

It is also our intention to provide a simplified speed changing mechanism for controlling the headstock transmission. We propose the use of a simple and effective direct reading dial indicating arrangement, operating in conjunction with the speed changing mechanism in order to facilitate speed selection with a minimum of mental effort upon the part of the operator of the lathe.

A novel feature of the speed change mechanism is the arrangement of an operating cam surrounding the spindle.

In the particular exemplary disclosure here illustrated, we utilize a full electrical control for the driving motor whereby the transmission may be started, stopped and reversed. A full electrical inching means is also provided to facilitate changing speeds. When the direct drive from the main motor to the spindle transmission is used, a separate motor for driving the rapid traverse mechanism is utilized as also disclosed in this exemplary embodiment. It is to be clearly understood, however, that the headstock transmission can also be adapted to be driven through friction clutch, brake and reversing mechanism mounted on the headstock as in the more conventional lathe structures. When this latter type of drive is employed, the drive to the traverse mechanism may be derived directly from the main drive motor, which under this arrangement runs constantly during the operation of the lathe.

In conjunction with this novel headstock transmission it is a purpose of this invention to provide a feed box which is mounted on the headstock.

An object of our invention also is to have a feed box which is totally enclosed and running in lubricant and which receives its driving power from the interior of the headstock on which it is mounted.

Another object is to provide a feed box having a wide range of feed changes and which is compact in design and smooth and quiet in operation.

It is also our idea to provide novel and simplified means on this feed box to mount and drive the driving and change gear mechanism for operating a relieving attachment.

In the more conventional feed box the operating handle for manipulating the tumbler gear cylinder has invariably been considerably radially removed from the axis of the cylinder. The result of this has been to cause the cylinder to bind in its journals when shifted axially, making it difficult and annoying to select the desired feeds and threads. We have completely overcome this inherent disadvantage of the conventional feed box by mounting a novel spade handle substantially on the axis of the tumbler cylinder so that the force for moving the cylinder axially will be applied along its axis and will not cause binding of the cylinder in its journals. This makes possible the easy selection of the desired feed.

Another advantage of this novel feed box is the provision of an index plate, showing feeds and threads, which is conveniently located in clear view of the operator and closely associated with the control levers of the feed box and headstock.

We provide a novel control box for the operating rods of the apron which is mounted on the bed of the lathe and is totally enclosed and flooded with lubricant. In this novel control box we provide a unique mechanism operating in conjunction with operating mechanism on the apron for the quick and easy reversal of the direction of feeding mechanism and lead screw for the carriage.

In the apron of this lathe we provide a mechanism for engaging and disengaging the longitudinal and cross feed, of a character substantially as disclosed and claimed in Patent No. 1,944,231, issued January 23, 1934. We provide a mechanism for operating the lead screw half-nuts as shown in Patent No. 980,971, issued January 10, 1911. An interlock between this feed control mechanism and the lead screw half-nuts is also substantially of a character shown in Patent No. 1,944,231.

We have also provided in the apron a unique mechanism for imparting a rapid traverse to the longitudinal feed and to the cross feed, in either direction, whereby a single lever completely controls any of the desired directions of traverse.

The above features will be described in detail and additional features will be pointed out in the following description:

In the drawings:

Fig. 2 is a left hand or headstock end elevation of the lathe shown in Fig. 1.

Fig. 3 is a vertical transverse section through the lathe as viewed toward the headstock end along the line 3—3 of Fig. 1.

Fig. 4 is a diagrammatic section through the headstock of the lathe perpendicular to the spindle axis along the line 4—4 of Figs. 6 and 14, showing the primary driving and speed changing mechanism of the headstock transmission.

Fig. 5 is a front elevation of the right hand portion of the lathe headstock showing an enlarged view of the change speed levers, and the associated direct reading speed indicating dials.

Fig. 6 is a diagrammatic section through the lathe headstock along the line 6—6 of Fig. 4, showing the worm driven back gearing, the spindle mounting, and driving mechanism for the feed box.

Fig. 7 is a diagrammatic illustration showing the position of the headstock gearing when the lathe is being operated in the worm driven low back gear speeds, the feed mechanism being directly driven from the spindle.

Fig. 8 is a diagrammatic illustration showing the position of the headstock gearing when the lathe is being operated in the worm driven high back gear speeds, the feed mechanism being directly driven from the spindle.

Fig. 9 is a diagrammatic illustration showing the position of the headstock gearing when the lathe is being operated in the high speeds, the spindle being driven directly through worm drive and the feed mechanism being also driven through a worm drive.

Fig. 10 is a diagrammatic illustration showing the position of the headstock gearing when the lathe is being used for relieving work and coarse threading.

Fig. 11 is a vertical transverse section through the headstock on a line 11—11 of Figs. 12, 14, 16, and 17 showing portions of the change speed gear shifting mechanism.

Fig. 12 is a vertical transverse section through the headstock on a line 12—12 of Figs. 13 and 16 showing the detent mechanism for the back gear shifting mechanism.

Fig. 13 is a plan view of the headstock transmission as seen with the top cover plate removed.

Fig. 14 is a vertical longitudinal section through the headstock on the line 14—14 of Figs. 11 and 13 showing the worm driven back gear and primary change speed gearing.

Fig. 15 is a vertical longitudinal section through the headstock along the line 15—15 of Fig. 13 showing the gearing for the speed indicating dials and the feed driving and reversing mechanism.

Fig. 16 is a vertical longitudinal cross section on the line 16—16 of Figs. 11 and 13 showing the worm drive to the spindle and the gear shifting cam surrounding the spindle.

Fig. 17 is a plan view of the headstock housing devoid of all mechanism to show particularly the arcuate bearing for supporting the gear shifting cam which surrounds the spindle.

Fig. 18 is a front elevation partly in section of the feed box on line 18—18 of Fig. 22, showing the general arrangement of the transmission and control mechanism.

Fig. 19 is a top plan view of the feed box to more clearly show the locating slots and indexing holes for the tumbler cylinder plunger.

Fig. 20 is a vertical elevation of the right hand end of the feed box showing the spade handle and indexing and locating plate for positioning the tumbler pinion cylinder.

Fig. 21 is a front elevation of a portion of the feed box showing the handle for controlling the major speed changes of the feed box transmission.

Fig. 22 is a vertical elevation of the feed box as shown in Fig. 20 but with the indexing and locating plate removed to show the interior arrangement of parts and driving connection from the headstock interior.

Fig. 24 is a top diagrammatic plan view of the feed box showing the arrangement of the driving mechanism for the relieving attachment.

Fig. 25 is a front elevation of the feed box with the relieving attachment driving mechanism attached.

Fig. 26 is a diagrammatic left hand end view showing the arrangement of gearing utilized for driving the relieving attachment and the carriage control box when relieving with standard threads and feeds.

Fig. 27 is a vertical transverse section through the feed drive mechanism on the line 27—27 of Figs. 1 and 28 showing the rapid traverse drive and feed reverse mechanism.

Fig. 28 is a vertical longitudinal section through the feed drive mechanism on the line 28—28 of Fig. 27, showing the gearing from the feed box and the mounting of the lead screw and the various feed and control rods.

Fig. 29 is a detailed plan view partly in section showing a portion of the feed reverse mechanism shown in Figs. 27 and 28.

Fig. 31 is a horizontal section on the line 31—31 of Figs. 30, 32, and 34, showing the longitudinal and cross feed operating mechanism.

Fig. 32 is a front elevation of the exterior of the apron along the line 32—32 of Fig. 31, the handwheel for longitudinal feeding motion not being shown.

Fig. 33 is a transverse section through the apron along the line 33—33 of Fig. 31 showing the mechanism for engaging the lead screw for thread chasing.

Fig. 33a is a face view of the scroll cam for operating the half-nuts when thread chasing.

Fig. 34 is an elevation of the right hand end of the apron showing particularly the chasing dial and the feed and lead screw reversing handle.

Fig. 35 is a diagrammatic section on the line 35—35 of Fig. 30 showing the transmision mechanism for rapid traverse to the carriage and cross slide.

Fig. 36 is a transverse section through the apron on the line 36—36 of Fig. 31 showing the rapid traverse reversing mechanism.

Fig. 37 is an elevation of the left hand end of the apron showing the spindle control handle.

Fig. 38 is a horizontal section on line 38—38 of Fig. 32 showing the mechanism for engaging either the longitudinal or cross rapid traverse motions.

Fig. 39 is a horizontal section on line 39—39 of Fig. 32 showing the mechanism for reversing the rapid traverse motions.

Fig. 40 is a detailed front elevation of a portion of the operating mechanism of Fig. 38.

Fig. 41 is a detailed view partly in section on the line 41—41 of Fig. 40.

Figure 1:
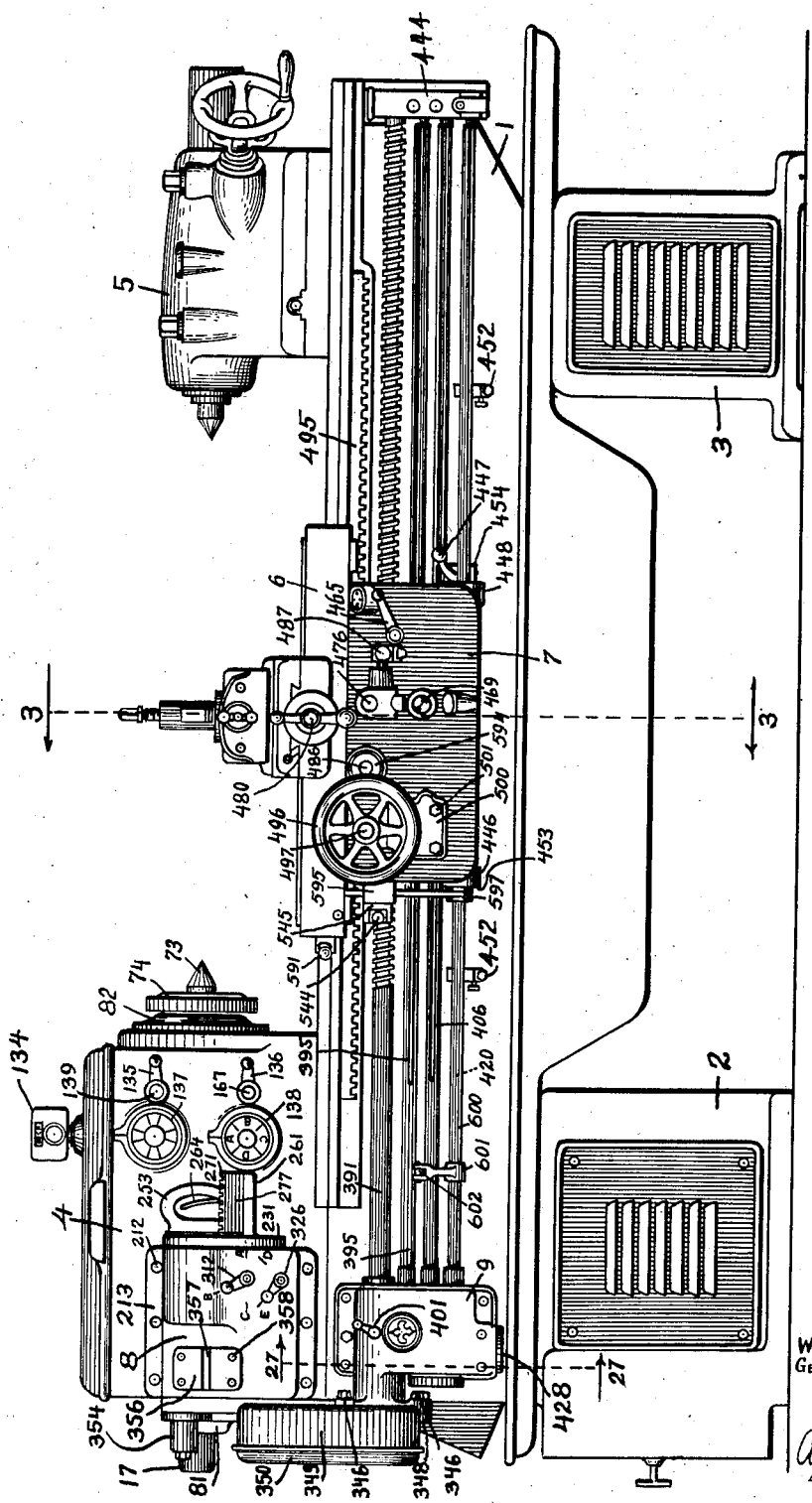
Figure 1 is a front elevation of a typical engine lathe for tool room use involving the principles of our invention.

The lathe comprises the usual bed 1 (Fig. 1) supported on the legs 2 and 3. Mounted on the bed 1 is the headstock 4, the tailstock 5, and the carriage 6 with its apron 7. The tailstock 5 is preferably of a construction fully disclosed and claimed in application Serial No. 21,209. It will not be described in detail, since in any event any suitable tailstock construction as known in the art may be employed. It is to be clearly noted that the feed box 8 is mounted on the headstock 4 and that a carriage control box 9 is provided on the bed for operating the lead screw, feed and rapid traverse rods, and control rods for driving the apron 7.

We will now describe and point out the novel features of the various units of the lathe as outlined above.

*Headstock transmission*

The prime source of power for driving the headstock and feed mechanism is derived from a constant speed motor (not shown) housed in the leg 2 which has attached to its driving shaft a pulley 10 (Figs. 2 and 3) which pulley is connected to the main driving pulley 11 of the headstock 4 by suitable belted transmission means 12.

Referring particularly to Fig. 4, the primary speed changes, eight in number in this particular illustrative example, are obtained through a sliding gear arrangement as follows: The main driving pulley 11 is secured to the drive shaft 14 by means of the key 15 and lock nut 16. The drive shaft 14 is located with its axis substantially perpendicular to the axis of the spindle 17 of the headstock and is journaled in an antifriction bearing 19 in the rear longitudinal wall 20 of the headstock 4 and in an anti-friction bearing 21 in the longitudinal partition 22 formed in the headstock interior. A combined oil seal and bearing retainer 23 provides means for adjusting the bearings 19 and 21 to prevent axial motion of the shaft 14. Between the bearings 19 and 21 the shaft 14 is provided with splines 24 upon which are slidingly mounted the axially shiftable compound gears 25 and 26. The compound gear 25 comprises the small gear 27 and the larger gear 28, the compound gear 26 comprises the small gear 29 and the larger gear 30, both of which gears are larger than the gear 28.

Arranged parallel with the drive shaft 14 is the intermediate shaft 31, journaled in anti-friction bearing 32 in the longitudinal rear wall 20 and in anti-friction bearing 33 in the interior partition 22. A combined closure cap and bearing retainer 34 provides means for adjusting the bearings 32 and 33 to prevent axial movement of the intermediate shaft 31. On this intermediate shaft are securely fixed by key 35 compound gear 36 comprising the large gear 37 and smaller gear 38, and compound gear 39 comprising the large gear 40 and smaller gear 41, both of which gears are smaller than the gear 38. The gears 37, 38, 40 and 41 are so disposed as to be engageable by the respective mating shiftable gears 27, 28, 29 and 30 as the compound gears 25 and 26 on the drive shaft 14 are shifted axially. The result of this arrangement is to produce four different speed rates for the intermediate shaft 31.

Also on the intermediate shaft 31 is slidably mounted the compound gear 42 on suitable splines 43 provided on the shaft for axial shifting thereof, which comprises the large gear 44 and smaller gear 45.

Located parallel with the drive shaft 14 and intermediate shaft 31, and therefore substantially perpendicular to the axis of the spindle 17, is the worm shaft 46 journaled in anti-friction bearing 47 in the rear longitudinal wall 20 and in anti-friction bearing 48 in the front longitudinal wall 49 and steadied by an intermediate anti-friction bearing 50 mounted in the interior partition 22. A combined closure and bearing retainer 51 provides means for adjusting the bearings 47 and 48 to prevent axial movement of the worm shaft 46.

Between the bearings 47 and 50 and adjacent the bearing 50 are mounted the gears 52 and 53 on the worm shaft and fixed to rotate the shaft 46 by means of a suitable key 54. The gears 52 and 53 are adapted to be engaged respectively by the mating gears 44 and 45 when the compound gear 42 is shifted axially. This arrangement thereby provides two changes of speed between the intermediate shaft 31 and the worm shaft 46 and in combination with the four speed changes obtainable between the drive shaft 14 and the intermediate shaft 31 as described, produces a total of eight speed changes for the worm shaft 46.

In addition to the primary speed changes just described we provide a worm driven low and high back gear speed change and also a direct high speed worm drive to the spindle. Referring particularly to Figs. 4 and 6, on the worm shaft 46, between the bearing 47 and the gear 52, the back gear worm 55 is mounted and securely fixed to the shaft by means of a pin 56. This worm 55 engages the worm wheel 57 secured to the back gear shaft 58 by a suitable key 59 and lock nut 60. The back gear shaft 58 is journaled in an anti-friction bearing 61 supported in the transverse interior partition 62 and in an anti-friction bearing 63 supported in the right hand end wall 62 and is steadied in an intermediate anti-friction bearing 65 mounted in the partition 62. The lock nut 60 threaded to the shaft 58 serves to securely lock the bearings 61 and 65 and the spacing sleeve 66 on the shaft 58. The lock nut 67 is utilized for properly adjusting the bearings 61 and 63 to prevent axial movement of the shaft 58. The worm 55 and worm wheel 57 are designed to produce a substantial speed reduction from the worm shaft 46 to the back gear shaft 58. In the particular example here shown the shaft 58 is driven one-fifth the speed of the worm shaft 46. Between the bearings 65 and 63 the back gear shaft 58 is provided with helical splines 68 upon which are slidably mounted a compound back gear 69 comprising the large helical gear 70 and the small helical gear 71.

The lathe spindle 17 having the usual bore 72, the center 73, and nose portion 74, is journaled in a precision anti-friction bearing 75 mounted in the wall 64 and in a precision anti-friction bearing 76 mounted in the partition 62. A lock nut 77 is threaded to the spindle 17 for properly adjusting the spindle in the bearings 75 and 76. A steadying bearing 78 secured to the spindle 17 by a lock nut 79 is supported in the left hand end wall 80. Suitable oil retaining means 81 and 82 are provided at each end of the spindle 17 to prevent escape of lubricant from the headstock interior.

Fixed to the spindle 17 between the bearings 75 and 76 is the large helical face gear 83 by means of the key 84 and the small spindle gear 85 and spacing collar 86 by means of the key 87. A lock nut 88 threaded to the spindle is utilized to bind the inner race of the bearing 75, gear 83, spacing collar 86, and gear 85 securely on the spindle 17. It is to be noted that the helical gears 70 and 71 of the compound back gear 69 are adapted to engage the respective mating helical gears 85 and 83 on the spindle 17 so that the spindle may be driven alternately by one or the other of said sets of gears. It is further to be noted that the helical gears 70 and 85 are of substantially the same size so that when these gears are in driving engagement the spindle 17 rotates at substantially the same speed as the back gear shaft 58. There is provided, however, a considerable gear reduction when the helical gears 71 and 83 are in driving engagement, the spindle 17 rotating at considerably slower speed than back gear shaft 58. In the particular illustration here shown, gears 70 and 85 are of the same diameter so as to provide no reduction; the gear 71 being constructed one-fifth the diameter of gear 83 to cause the spindle 17 to rotate at one-fifth the speed of the back gear shaft 58. By making the gears 70, 71, 83 and 85 of helical type a very smooth and efficient drive is provided. This necessitates the utilization of the helical splined portion 68 of the back gear shaft 58 in order to facilitate axial shifting of the compound back gear 69 and to neutralize axial thrust along the splines 68 brought about by the helical construction of the gear teeth.

The high speed drive to the spindle 17 is provided through a direct right angle worm or spiral gear drive. On the worm shaft 46, between the bearings 48 and 50 and adjacent to the bearing 50, is secured a worm 89 by means of a pin 90 and key 90a, which worm engages the worm wheel 91 journaled for free rotation upon the cylindrical surface 92 of the spindle 17. The worm wheel 91 is confined axially of the shaft by suitable locating means 93 and 94 secured on the spindle 17. In order to provide means for alternately connecting and disconnecting the worm wheel 91 in driving relation on the spindle 17, a clutch gear 95 is mounted for axial movement on suitable splines 96 on the spindle, the clutch collar 95 having clutch teeth 97 adapted to engage mating clutch teeth 98 formed integral with the worm wheel 91 so that as the clutch collar 95 is moved to the left (Fig. 6) the worm wheel 91 will be in positive driving relation with the spindle 17 and when the clutch collar 95 is moved to the right the worm wheel 91 will be free to rotate on the spindle 17.

We provide a novel driving arrangement between the headstock transmission and the feed box 8, whereby the feed box 8 is driven directly through gears from the spindle 17 when the low and high back gear speeds are being used, and whereby it is driven through worm gearing when the high spindle speeds are being utilized. This driving arrangement is also wholly enclosed in the headstock and feed box interiors and is flooded with lubricant. Referring particularly to Figs. 4, 6, and 15, on the worm shaft 46, between the worm 89 and bearing 48, is fixed the feed worm 99 which engages the worm wheel 100 mounted for free rotation upon the bearing portion 101 of the feed reversing shaft 102. The drive through the worm 99 and the worm wheel is of substantial reduction. In this particular illustration a reduction of five-to-one is provided. The feed reversing shaft 102 is arranged parallel with the spindle and is journaled in an anti-friction bearing 103 mounted in the left hand wall 80 and an anti-friction bearing 104 mounted in the interior partition 62. The lock nut 105 threaded to the left hand end of the shaft 102 (Fig. 6) is utilized to hold the thrust collar 106 and bearing 103 tightly against the shoulder 107 of the shaft 102. The lock nut 108 is utilized for the proper adjustment of the bearings 103 and 104 to prevent axial motion in the shaft 102. Mounted on the shaft 102 between the thrust collar 106 and the worm wheel 100 is the forward feed gear 109 mounted to free rotation on the bearing portion 110 of the shaft; also a splined clutch sleeve 111 fixed in driving relation to the shaft by means of the key 112, and also a reverse feed gear 113 free to rotate on the bearing portion 101 of the shaft. A fixed locating means 114 on the shaft 102 in cooperation with the fixed thrust collar 106 serves properly to position the parts 109, 111, 113, and 100 axially of the shaft. Mounted on splines 111ª of the clutch sleeve 111 for axial movement is a double-end single-tooth clutch 115 having a single tooth 116 adapted to engage the single tooth 117 formed integral with the gear 109 and a single tooth 118 adapted to engage the single tooth 119 formed integral with the gear 113, this arrangement providing means for alternately causing gear 109 and gear 113 to be driven from the shaft 102.

The means for driving the feed directly from the spindle through gearing when low and high back gear speeds are being used and through worm drive when high spindle speeds are being used comprises the clutch gear 120 which is adapted to slide axially of the splines 121 provided on the shaft 102, and which has clutch teeth 122 adapted to engage mating teeth 123 formed integral with the worm wheel 100. Engagement of these teeth 122 and 123 causes shaft 102 to be driven by the worm wheel 100; disengagement of the teeth causes the worm wheel to run free on the shaft 102. The gear 120 is adapted to engage in driving relation a gear 124 of the same diameter formed integral with the sliding clutch collar 95. The gears 120 and 124 are arranged for driving engagement only when the clutch teeth 97 of the clutch collar 95 are disengaged from the clutch teeth 98 of the worm wheel 91. The gears 120 and 124 are not permitted to be in driving engagement when the clutch teeth 122 of the gear 120 are engaged with the teeth 123 of the feed worm wheel 100.

The reverse for the feed mechanism is provided by means of a shaft 125 located parallel to the shaft 102 and fixed in the left hand wall 80 and also fixed in a projection 126 in the interior of the headstock. Rotating on this fixed shaft 125 on suitable anti-friction bearings 127, and axially located between the wall 80 and projection 126, is a compound gear 128 comprising the large gear 129 constantly in mesh with gear 109, and of identical size, and a smaller gear 130 of the same size as gear 113 but meshing with the idler gear 131. The idler gear 131 is free to rotate on a suitable anti-friction bearing 132 on a stud shaft 133 fixed in the longitudinal front wall 49 of the headstock and engages the gear 113. The gear 129 is adapted to connect with the gearing (Fig. 23) in the feed box 8 for driving the feeding mechanism.

It can thus be clearly seen that as the single tooth clutch 115 is shifted to engage either the gear 109 or the gear 113 in driving relation on the shaft 102, the compound gear 128 can be caused to rotate in either direction thus reversing the feed drive through gear 129 as will be described later. Also by making the gears 109 and 129 of the same diameter, and also the gears 113 and 130 of the same diameter, and utilizing single-tooth clutches, the lead screw may be reversed when thread cutting without losing the correct setting of the cutting tool relative to the thread being chased. In the headstock transmission it is essential that the ratios between the worm 55 and worm wheel 57, the back gear 71 and face gear 83, and the feed worm 99 and feed worm wheel 100 all be the same. It is also advisable to select an even ratio for these speed reductions in order to obtain the proper values for thread cutting. It is additionally important that the gears 70 and 85 be of equal diameter and that the direct drive feed gears 120 and 124 be of equal diameter to aid in obtaining proper selection of threads.

In order more clearly to bring out the functions of the novel headstock transmission we illustrate in Figs. 7, 8, 9, and 10 the various combinations utilized, in conjunction with the primary speed changes already described, when operating the lathe in low back gear speeds, high back gear speeds, high spindle speeds, and when lead cutting and using a relieving attachment. While we will state the particular gear ratios involved in this particular exemplary disclosure, it is to be clearly understood that we are not limited to the specific ratios indicated nor are we limited to the specific detailed construction of the parts shown.

In Fig. 7 is illustrated the transmission gearing selected when the lathe is being operated in low back gear in the slow spindle speeds for ordinary turning and facing operations. The spindle is then being driven from the primary speed changes through the five-to-one reduction of the worm 55 and worm wheel 57 on the back gear shaft 58 and then through the five-to-one face gear drive comprising the gears 71 and 83. Under these conditions the spindle rotates at one-twenty-fifth the speed of the worm shaft 46. The feed drive under these conditions is geared directly to the spindle by the engagement of gears 120 and 124, the clutch teeth 97 and 98 and the clutch teeth 123 and 122 being disengaged; and it rotates at spindle speed thereby causing the driving gear 129 for the feed box 8 to rotate at spindle speed. Under these circumstances the lathe is adapted to the low range of speeds with standard feeds and threads available.

In Fig. 8 is illustrated substantially the same driving arrangement indicated in Fig. 7, except that the back gear 69 has been shifted so that gears 70 and 85 are in driving engagement. Under these conditions the spindle 17 then rotates at one-fifth the speed of the worm shaft 46 since the speed reduction is now solely through the worm 55 and worm wheel 57. The feed drive is also running at spindle speed as in Fig. 7. Under these conditions the lathe is adapted to the medium speed ranges with standard feeds and threads available.

Fig. 9 illustrates the transmission arranged for operating the lathe at high spindle speeds. The back gear 69 is shifted to neutral position, the gears 70 and 85 and gears 68 and 83 are disengaged, and the back gear shaft 58 idles at its normal speed which is one-fifth the speed of the worm shaft 46. The one-to-one worm drive through the worm 89 and worm wheel 91 has been connected to the spindle by engaging the clutch teeth 97 and 98 thereby driving the spindle at the same speed as the worm shaft 46. At the same time the direct drive from the spindle to the feed drive gearing is disconnected by disengaging the gears 120 and 124. The feed drive gearing is then connected to the worm shaft through the five-to-one worm gear reduction comprising the worm 99 and worm wheel 100, the feed drive gearing now operating at one-fifth spindle speed to produce feeds one-fifth of the standard feeds. Under these circumstances the lathe is adapted to high speeds with fine feeds. The fine threads, which are also available under these conditions, could not practically be used in this high spindle speed range.

Fig. 10 illustrates the combination of gearing available when it is desired to cut very coarse pitch threads or when using a relieving attachment. The drive to the spindle, as in Fig. 7, is through the five-to-one reduction of the worm 55 and worm wheel 57 to the back gear shaft 58, the five-to-one face gears 71 and 83 being engaged, thus causing the spindle to rotate at one twenty-fifth the speed of the worm shaft 46. The clutch teeth 97 and 98 and the gears 120 and 124 are disengaged. The clutch teeth 122 and 123 are engaged so that the feed drive mechanism is driven through the five-to-one worm reduction comprising the worm 99 and worm wheel 100 so that the feed gearing is driven at one-fifth the speed of the worm shaft 46. By this arrangement the feed gearing will therefore be rotated five times as fast as the spindle when the spindle is operated in the low speed range. This makes possible the chasing of very coarse threads, five times the standard pitch of threads (or greater if greater worm reductions are selected) and the utilization of a relieving attachment for cutters, hobs, etc., without the use of a sub-head and without causing undue strain in the feeding mechanism. The driving gearing to operate the relieving attachment and the carriage from the feed box 8 will be discussed later in the description of the relieving attachment driving mechanism, it being necessary to provide the usual change gearing for the relieving attachment drive to obtain the proper number of flutes or oscillations for the reciprocating cutting tool and also a reduction change gearing from the feed box to the apron drive to obtain standard threads for relieving spiral cutters, hobs, or the like.

It is to be clearly noted that while we show a primary speed change transmission between the drive shaft 14 and the worm shaft 46 it is also well within the scope of our invention to apply the prime source of driving power directly to the worm shaft 46. For instance, the driving pulley 11 might be mounted on an extension of the worm shaft 46 and a variable speed driving motor applied to driving the pulley. In fact, any variable power source might easily be applied in this manner to properly operate the lathe, utilizing the features of our invention. A constant speed drive might also be applied if it were desired only to have three major speed changes for the lathe spindle.

*Headstock transmission control*

No friction clutch or friction driving elements are involved in any of the headstock transmissions here illustrated. The motor is coupled directly to the transmission as described, the starting, stopping and reversing of the transmission being accomplished entirely by control of the prime source of power. A suitable remote control push button station 134, conveniently located on the headstock 4, is provided for controlling the various functions of the prime source of power. However, as pointed out above, it is quite practical to drive the transmission effectively by attaching a friction clutch, brake, and reversing mechanism to the drive shaft 14 in place of the direct drive pulley 11.

Referring particularly to Figs. 1 and 5, the control for the headstock transmission comprises two control levers 135 and 136 having indicating dials 137 and 138 respectively associated with the control levers, this arrangement being located on the front of the headstock in convenient position for the operator.

The control lever 135 with its dial 137 are utilized for making and indicating the primary speed changes already described. Referring to Figs. 11, 13, and 15, the handle 135 is fixed to the shaft 139 which is journaled in the front wall 49 of the headstock and journaled at its inner end in the bracket 140 projecting from the front wall 49. A pinion gear 141 is formed integral with the shaft 139 intermediate the front wall 49 and the bracket 140. The pinion 141 is adapted to drive the gear 142 of the compound gear 143. The compound gear 143, comprising the gears 142 and 144, is fixed to and adapted to rotate the shaft 145, which is journaled in the bracket 140 and in the front wall 49. The end of the shaft 145 journaled in the front wall 49 has attached to it the indicating dial 137. The ratio of the pinion 141 to the gear 142 is so proportioned that with one complete revolution of the handle 135 the dial 137 will move from one indicating position to the next. For example, in Fig. 5, as the handle 135 is rotated one complete revolution to the right, the indicating space 146 will move to the left away from the indicating line 147, the indicating space 148 then being brought in alignment with the indicating line 147.

A cam shaft 149, supporting and rotating the shifter cam 150, is journaled in the bracket 140 and journaled in the rear wall 20. On the extension of the shaft 149 projecting from the bracket 140, and between the bracket 140 and the gear 142, is fixed a gear 151 of the same size and meshing with the gear 144. The result of this arrangement is to permit rotation of the cam 150 by the control handle 135 through the drive constituting the gears 141, 142, 144 and 151. It is also to be noted that the dial 137 and the cam 150, through the like gears 144 and 151, make complete revolutions at the same time.

The shifter cam 150 is provided with a series of cam slots 152, 153, and 154 which are adapted to actuate the free ends of the respective shifter rods 155, 156 and 157. Noting particularly Figs. 13 and 14, the lever 155 is fixed on the rock shaft 158 journaled in the partition 62 and extending downward to near the bottom of the headstock. A shifter arm 159 is fixed at one end to the lower end of the rock shaft 158 and has a suitable shifter shoe 160 engaging the compound gear 25. In a like manner the shifter 156 is fixed on a rock shaft 161 also journaled in the partition 62 and extending downward to near the bottom of the headstock. A shifter arm 162 is fixed at one end to the lower end of the rock shaft 161 and has a suitable shifter shoe 163 engaging the compound gear 26. The shifter lever 157, pivotally mounted on the rock shaft 164 fixed in the partition 62, has an integral shifter arm 165 which carries a suitable shifter shoe 166 adapted to engage the compound gear 42. It can be clearly seen that the nature of the cam slots 152, 153, and 154 of the cam drum 150 will cause the free ends of the shifter levers 155, 156, and 157 to be moved substantially axially of the cam 150 as it is rotated by the control handle 135. Likewise, the shifter shoes 160, 163, and 166 of the respective shifter arms 159, 162, and 165 will move substantially axially of the shafts 14 and 31 so that the compound gears 25, 26 and 42 will be shifted axially of their respective shafts. The cam slots 152, 153, and 154 are so arranged as to give a proper sequence of shifting so as to produce the desired progression of primary speed changes with a complete revolution of the cam 150 and its indicating dial 136.

The control lever and indicating dial, Figs. 1 and 5, for operating the headstock transmission in low back gear, high back gear, high speed, or for lead cutting and relieving as described and referred to in Figs. 7, 8, 9, and 10 respectively, comprises the control lever 136 and indicating dial 138, located conveniently at the front of the headstock directly below the primary speed change control handle 135 and dial 137.

Referring particularly to Figs. 11 through 17, the control lever 136 is secured to the shaft 167 which is journaled in the front wall 49 and in the interior partition 22. Between the journals and adjacent the journal in the front wall 49, is formed, integral with the shaft, a pinion gear 168 which engages a gear 169 on a stub shaft 170 journaled in the front wall 49, the exterior extension of said shaft being connected to the indicating dial 138. This arrangement provides means whereby the dial 138 is rotated in proper relation to the movement of the control lever 136. On the shaft 167 between the gear 168 and the partition 22 is formed an integral worm 171 which is adapted to engage and drive a worm wheel 172 formed integral with the rotary cylindrical cam drum 173. This cam drum 173 surrounds the spindle 17 and the hubs of the driving gears 83 and 85 mounted on the spindle; but does not in any way contact these members. The means for supporting the drum cam 173 free of such contact comprises an arcuate bearing 174, formed integral with the headstock housing, in which the cam 173 rests and is adapted to be rotated by means of the control handle 136 through the worm 171 and worm wheel 172, as described. Axial movement of the drum cam 173, Fig. 6, is prevented by sliding engagement of suitable faces 175 and 176 against the respective faces 177 and 178 of the support bearing 174.

A combined detent and locating means for holding the drum cam 173 in proper engagement with the support bearing 174 and maintaining proper engagement of the worm 171 and worm wheel 172, comprises a lever arm 179, Figs. 12, 13, and 16, pivotally mounted on a stud 180 fixed in the partition 62 and having a projection 181 formed integral therewith and adapted to engage detent notches 182 in an annular groove 183 provided around the left hand end, Fig. 6, of the drum cam 173. A tension spring 184 fixed to the partition 22 by suitable means 185 and connected to the outer end 186 of the lever arm 179 provides means for yieldingly urging the projection against the drum cam 173 diametrically opposite the support bearing 174 whereby to hold the cam drum 173 in proper contact with the bearing 174.

On the periphery of the drum cam 173, intermediate the worm wheel 172 and the annular groove 183, are a series of cam slots 187, 188, and 189, Figs. 6, 13, and 16. The cam slot 187 is adapted to actuate the shifter yoke 190 which is pivotally mounted on a shaft 191 fixed in the rear wall 20 and the partition 22. In the ends 190a and 190b of the forks of the yoke 190 are mounted suitable shoes 192 and 193 adapted to operate in the annular groove 194 in the ring 195 fixed to the back gear 69. A pin 196 projecting from the end 190b of the yoke 190 engages the cam slot 187. Rotation of the cam drum 173 thereby swings the yoke 190 so as to slide the back gear 69 axially of the shaft 58 to either low or high back gear positions.

Referring particularly to Figs. 13, 15, and 16, the clutch gear 120 mounted on the shaft 102 is shifted by the cam slot 188 through axial movement of the rod 197 supported in partition 62 and partition 126. A shifter yoke 198 fixed to the rod 197 engages the annular slot 199 in gear 120 so that the gear 120 may be moved axially of the shaft 102 by axial movement of the rod 197. The rod 197 is connected to the cam slot 188 for this axial movement by the block 200 fixed to the rod 197 and having a suitable projection 201 engaging in the slot 188.

The clutch gear collar 95 is shifted by the cam slot 189 through axial movement of the rod 202 supported in the partition 62 and the partition 126. A shifter yoke 203 fixed to the rod 202 engages the annular slot 204 in the clutch gear 95 so that the clutch gear 95 may be moved axially of the spindle 17 by axial movement of the rod 202. The rod 197 is connected to the cam slot 189 for this axial movement by the block 205 fixed to the rod 202 and having a suitable projection 206 engaging in the slot 189.

It is to be clearly understood that the cam slots 187, 188, and 189 are so formed on the drum cam 173 that when it is rotated by the control lever 136 the back gear 67, the clutch gear 95 and the clutch gear 120 will be moved, by the means just described, in a sequence as discussed with reference to Figs. 7, 8, 9, and 10 and that the indicating dial 138 associated with the control handle 136 will at all times show the gearing arrangement selected.

*Feed box transmission*

Figure 23:
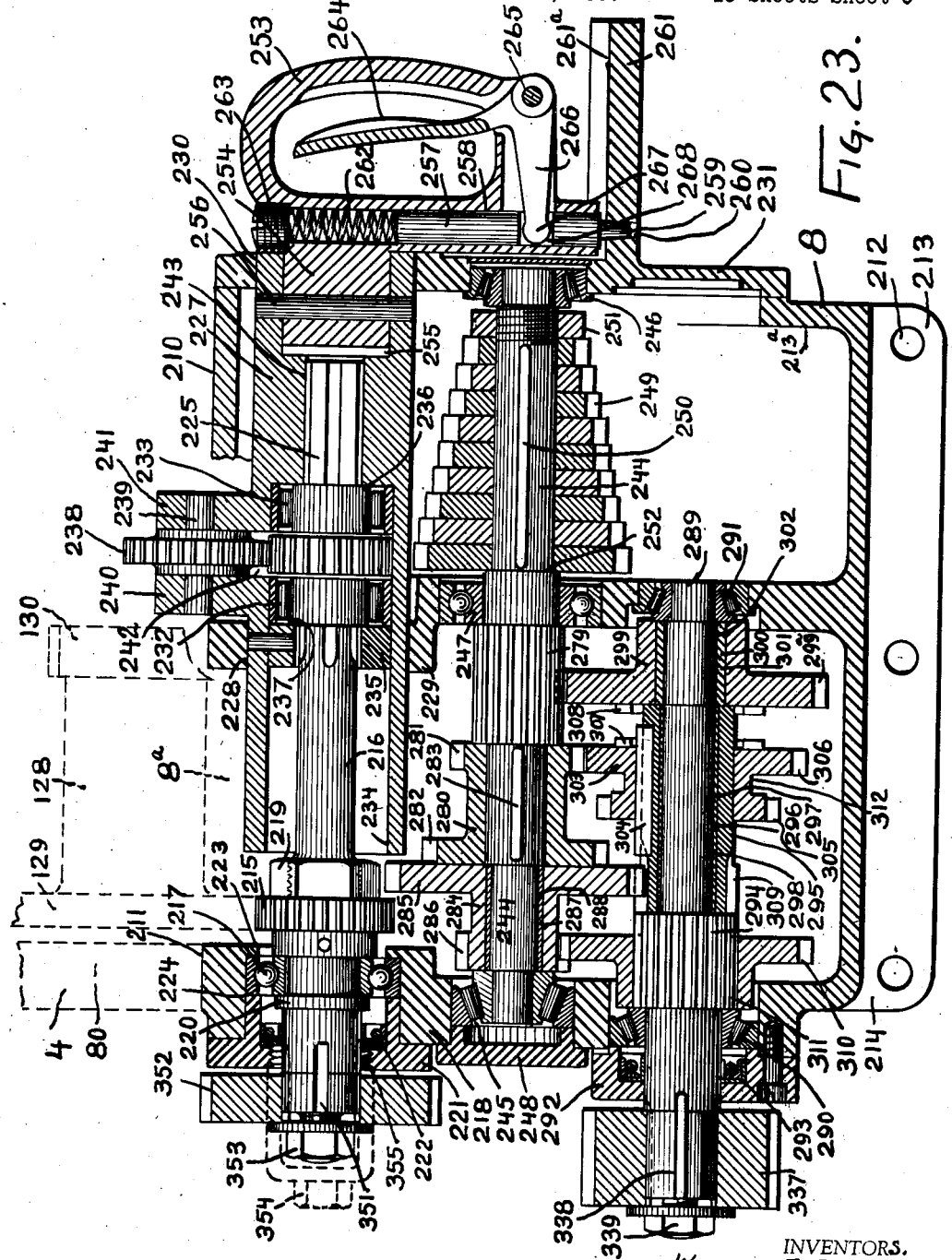
Fig. 23 is a diagrammatic sectional view on the line 23—23 of Fig. 22 showing in detail the arrangement of the gearing and construction of the tumbler pinion operating mechanism.

The novel feed box transmission of our invention is completely enclosed in the feed box 8 and is flooded by lubricant derived from the headstock interior through the opening 4a (Fig. 17) which matches a similar opening 8a of the feed box 8, Fig. 23. The feed box is mounted on the front of the headstock 4, conveniently located with respect to the operator. Referring to Figs. 1, 2, 3, 18, 19, 20, 21, 22, and 23, the feed box 8 has an accurately machined locating face 210 adapted to abut against an accurately machined locating face 211 provided on the front wall 49 of the headstock 4. Suitable bolts 212 are provided passing through the integral flanges 213 and 214 of the feed box 8 into appropriate tapped holes in the locating face 211 of the headstock 4, so as securely to hold the box to the headstock and provide a lubricant-tight connection between the faces 210 and 211.

Referring particularly to Figs. 22 and 23, as described above, the drive for the feed box is derived from the gear 129 in the interior of the headstock 4 which drives the gear 215 which is fixed in driving relation on the tumbler cylinder drive shaft 216. The left hand end (Fig. 23) of the shaft 216 is journaled in a suitable anti-friction bearing 217 mounted in the left hand wall 218 of the feed box 8. A nut 219 threaded to the shaft 216 securely holds the inner race of the bearing 217 and driving gear 215 securely against the integral annular flange 220 of the shaft 216. The bearing 217 is held in fixed axial position in the wall 218 by the oil seal ring 221 having the oil seal 222, by holding the outer race of the bearing 217 against the shoulder 223 of the bore 224. The shaft 216 is thus held from axial movement, the bearing 217 being of a character to prevent substantially all axial movement in the shaft. The right hand end of the drive shaft 216 is provided with splines 225 which are slidingly supported in a suitable mating splined bore of the tumbler pinion 226, which arrangement provides support for the drive shaft 216 to hold it in proper axial alignment.

The feed box 8 has a very unique construction to provide ease of operation upon the part of the operator. The tumbler cylinder 227 is journaled for axial and pivotal motions in a bore 228 provided in a transverse partition 229 formed integral with the feed box 8 and journaled in a bore 230 in the locating and indexing plate 231, which plate is secured to the right hand end 231a of the feed box 8 by suitable screws 231b. The tumbler pinion 226 is journaled on suitable anti-friction bearings 232 and 233 in the relatively large bore 234 in the tumbler cylinder 227. A locating collar 235 fixed in the bore 234 adjacent the bearing 232 confines the bearings 232 and 233 and the tumbler pinion 226 between the inner face 236 of the bore 234 and the face 237 of the locating collar 235 to thereby prevent substantially all axial movement in the bore 234 of the cylinder 227. The tumbler gear 238 is journaled on the pin 239 fixed in the radially extending bosses 240 and 241 formed integral with the cylinder 227. The radially extending slot 242 between the bosses 240 and 241 extends into the bore 234 and provides means for axially positioning the gear 238 in the pin 239 to thereby maintain driving engagement between the tumbler pinion 226 and the tumbler gear 238 at all times. A clearance bore 243 is provided in the tumbler cylinder 227 for the extended splined end 225 of the drive shaft 216.

The cone gear shaft 244 is journaled in an anti-friction bearing 245 mounted in the left hand wall 218 of the feed box 8 and in an anti-friction bearing 246 mounted in the locating and indexing plate 231. An intermediate anti-friction bearing 247 for supporting the shaft intermediate the bearings 245 and 246 is mounted in the partition 229 of the feed box 8, the bearing retainer 248 serving to properly adjust the bearings 245 and 246. A cone of gears 249 is fixed to the shaft 244 by means of a suitable key 250 and is secured in proper axial position on the shaft by the lock nut 251 which binds the cone of gears 249 against the shoulder 252 of the shaft 244 adjacent the bearing 247.

We provide a very novel and easily operated control means for causing the tumbler gear 238 to selectively engage the various gears of the cone of gears 249. A manipulating handle 253, of a shape similar to that of a spade handle, has a cylindrical lug 254 snugly fitting in the bore 255 in the right hand end of the tumbler cylinder 227 and secured in place by means of the pin 256. It can thus be seen that the manipulating handle 253 for rocking and axially moving the tumbler cylinder 227 is located substantially on the axis of the cylinder 227.

We provide a unique arrangement for promoting easy selection of tumbler gear positions for cone gear engagement, and for securely holding the tumbler gear in selected position. In the manipulating handle 253, there is provided a plunger 257, in a diametral bore 258, which plunger has a tapered end 259 adapted to engage mating, tapered locating and indexing holes 260 in an arcuate projection 261 formed integral with the plate 231 and having the radius of curvature of its upper surface 261a substantially concentric with the axis of the cylinder 227. A spring 262 secured in the bore 258 by means of the threaded plug 263, yieldingly urges the plunger 257 radially outward relative to the axis of the tumbler drum 227 whereby to hold the tapered end 259 of the plunger 257 in secure engagement with any of the various tapered holes 260. A trigger 264 pivotally mounted on a pin 265 fixed in the handle 253 and having an integral arm 266 with a rounded end 267 engaging a slot 268 in the plunger 257, provides means for withdrawing the plunger from the tapered holes 260 when selecting the various gear changes.

It is to be clearly noted that with the handle 253 gripped with the hand and the plunger 257 withdrawn by pressure of the fingers on the trigger 264, the cylinder may be rotated circumferentially and moved axially to select the desired gear change. It is also to be noted that since the handle 253 is located substantially on the axis of the cylinder 227, axial movement of the cylinder by means of the handle causes no binding or cocking of the cylinder in its journals 228 and 230 as is encountered in all of the prior conventional feed change boxes. Another important improvement over prior constructions is the location of the point of engagement of the indexing pin 257 with the tapered holes 260 radially far removed from the axis of the cylinder 227 while at the same time having the plunger closely coupled and located relatively near to the tumbler gear 238, rather than relatively far removed on the end of the manipulating handle as in prior constructions.

In order to facilitate obtaining the proper gear selection, an inclined portion 269 of the arcuate projection 261, facing outward and upward transverse of the lathe, has formed on its upper edge 270 a series of gear change finding notches 271 corresponding in number and relative position to the gear changes obtainable from the cone of gears 249. On the handle 253 there is formed an integral lug 272 having an arcuate indicating blade 273 with a curvature concentric with the axis of the cylinder 227 and of a width to pass with ample clearance through the slots 271 when the cylinder 227 is rotated. A cut-away portion 274 is provided in the indicating blade 273 so that when the handle 253, Fig. 20, has been rotated to its extreme clockwise position so that the end 275 of the handle 253 is in contact with the portion 276 of the inclined portion 269, the cut-away portion 274 will then permit the handle and cylinder to be shifted axially. An index plate 277 secured to the inclined portion 269 has columns 278 coinciding with the various notches 271 which show the various threads and feeds obtainable in each of the notches selected.

The operation of shifting the cylinder is relatively simple. The operator grips the handle 253 and depresses the trigger 264 thereby releasing the plunger 257 from one of the tapered holes 260. The operator then rotates the handle clockwise, Fig. 20, until the end 275 of the handle 253 engages the surface 276 of the inclined portion 269 and at the same time removing the indicating blade 273 from an indicating slot 271. Under these conditions the cylinder 227 is free to be moved axially in either direction for its maximum travel. The desired thread or feed is selected on the index plate and the handle 253 is moved axially until the blade 273 is positioned over the slot 271 coinciding with the column of the index plate in which the desired thread or feed is found. The operator then merely rotates the cylinder counterclockwise, which automatically causes the plunger 257 to engage in the proper tapered hole 260 so as properly to mesh the tumbler gear 238 with the cone of gears 249. The main advantage of the indicating notches 271 and indicating blade is to enable the operator to quickly and easily determine the proper setting of the tumbler cylinder relative to the index plate, a feature novel with us. This arrangement also prevents improper meshing of the tumbler gear 238 with the cone of gears 249 and also avoids the necessity of jiggling the cylinder 227 in order to find the proper tapered hole 260 for the locating plunger 257.

In order to provide a wide range of threads and feeds, beyond the scope obtainable by means of the cone of gears 249, we provide a series of coarse speed changes in the feed box 8, in addition to the gear changes just described. On the cone gear shaft 244 and integral therewith between the bearings 245 and 247, and adjacent the latter, is formed a twelve-tooth pinion 279. Adjacent the pinion 279 is secured to the shaft 244 a compound gear 280 comprising the small twenty-tooth gear 281 and the larger thirty-tooth gear 282, the compound gear 280 being fixed in driving relation on the shaft 244 by means of the key 283. Between the compound gear 280 and the bearing 245 is journaled the compound gear 284, comprising the large forty-five-tooth gear 285 and the small fifteen-tooth gear 286, having a bushing 287 fixed in its bore and adapted to rotate freely upon the bearing portion 288 of the shaft 244.

Closely associated with and parallel to the shaft 244 there is provided an output driveshaft 289 for the feed box 8, journaled in an anti-friction bearing 290 mounted in the wall 218 and also journaled in an anti-friction bearing 291 mounted in the partition 229. The bearing retainer 292, having the lubricant seal 293, serves properly to adjust the bearings 290 and 291 to eliminate substantially all axial movement in the shaft 289. Formed integral with the shaft 289 adjacent the bearing 290, and between this bearing and the bearing 291, is a fifteen-tooth pinion 294. Adjacent the pinion 294 there is rotatively mounted a pinion sleeve 295 having a bearing bushing 296 fixed in its bore 297 and adapted to revolve on the bearing portion 298 of the shaft 289. Between the pinion sleeve 295 and the bearing 291 there is rotatively mounted the clutch gear 299 having a bearing bushing 300 fixed in its bore 301 and adapted to revolve on the bearing portion 302 of the shaft 289. The clutch gear 299 comprises a forty-eight-tooth gear 299a in constant engagement with the twelve-tooth pinion 279 of the shaft 244. Mounted for axial movement on the pinion sleeve 295 is a compound gear 303 adapted to drive the sleeve 295 by means of a key 304 fixed in the sleeve and having sliding engagement in a suitable keyway in the compound gear 303. The compound gear 303 comprises a small thirty-tooth gear 305, a large forty-tooth gear 306, and clutch teeth 307 on the face of the gear 306. When the compound gear 303 is shifted axially to its extreme left position, Fig. 23, the gears 305 and 282 will be brought in to driving engagement. When shifted to its intermediate position, as shown in Fig. 23, the gears 306 and 281 will be in driving relation. When the compound gear 303 is shifted to its extreme right position the clutch teeth 307 will engage mating clutch teeth 308 on the face of the gear 299a. Only one of these combinations are engageable at a time.

Formed integral with the pinion sleeve 295 and adjacent the pinion 294 is a fifteen-tooth pinion 309 of the same dimensions as the pinion 294 of the shaft 289, a portion of the pinion 309 removed from the pinion 294 being in constant driving engagement with the gear 285. On the pinion 294 is mounted a forty-tooth gear 310 having a bore 311, which is an internal gear snugly fitting about the teeth of the pinion 294 but permitting the gear 310 to be shifted axially of the shaft 289. When the gear 310 is shifted fully to the left, as shown in Fig. 23, it will be supported only on the pinion 294 and will then be in driving engagement with the gear 286. When shifted fully to the right, the gear 310 will be disengaged from the gear 286. The internal gear bore 311 of the gear 310 will then engage over the portion of the pinion 309 adjacent the pinion 294 so as to provide a positive driving connection between the shaft 289 and pinion sleeve 295.

In noting the specific example of gear ratios here illustrated we wish to point out the very wide range of speeds obtainable from this arrangement. A series of speed changes, between the cone shaft 244 and feed output shaft 289, from one to thirty-two-to-one are obtained as follows: With the gears 310 shifted to the right so that the sleeve 295 is connected in direct driving relation to the output shaft 289, the engagement of gears 282 and 305 provides a 1-to-1 ratio; engagement of gears 281 and 306 provides a 2-to-1 ratio; and engagement of the clutches 307 and 308 provides a 4-to-1 ratio. With the gear 310 shifted to the left engaging the gear 286 an 8-to-1 ratio is provided from the sleeve 295 and the output shaft 289 through the gears 309 driving gear 285 and gear 286 driving gear 294; so that engagement of gear 282 and 305 provides an 8-to-1 ratio; engagement of gears 281 and 306 provides a ratio of 16-to-1; and engagement of the clutches 307 and 308 provides a 32-to-1 ratio. Intermediate ratios between the six major ratios just noted are obtained from the cone of gears 249 cooperating with the tumbler gear 238 as already described.

While we have cited specific gear ratios in this illustration to give some idea of the wide range of feeds and threads obtainable from this novel, compact feed box transmission, it is to be clearly understood that we are in no way limited in the scope of our invention to the specific example herein disclosed.

The means for selecting the six major speed changes of the feed box transmission noted above comprises a control handle 312, Figs. 1, 18, 20, 21, 22, 24, and 25, fixed to the transversely located rock shaft 313 journaled in the front wall 314 and rear wall 315 of the feed box 8. On the shaft 313 is fixed a gear 316, between the wall 315 and 314 and adjacent the latter wall 314, which is adapted to engage a rack 317 formed on the top of the longitudinally located shifter rod 318, the rod 318 being mounted and axially slidable in the wall 218, in the partition 229, and in a boss 319 formed integral with the wall 231a of the feed box. Fixed to the rod 318 intermediate the wall 218 and partition 229 is a shifter yoke 320 adapted to contact the compound gear 303 in the annular slot 312. Thus, by moving the handle 312 to the right or left, the rod 318 (through the rack 317 and gear 316) will be moved axially; and by means of the shifter yoke 320 the compound gear 303 can be easily shifted to the respective positions already discussed. Indicating letters A, B, and C, shown in Figs. 1, 21, and 25, are provided to show the position selected relative to the feeds and threads obtained as shown on the index plate 277. These positions are shown in column 321 of the index plate 277. A detent arrangement, comprising the plunger 322 urged against the rod 318 by a spring 323 in a suitable bore 324 in the boss 319, engages in the notches 325 when proper shifted positions are selected.

In a like manner the gear 310 is shifted by means of the handle 326, located directly under the handle 312, through the transverse rod 327, the gear 328, the rack 329 on the rod 330, and the shifter yoke 331 fixed to the shaft and engaging around the gear 10. A detent means comprising the plunger 332 urged against the rod 330 by a spring 333 in a suitable bore 334 in the boss 319 engages in the notches 335 when shifted positions are properly selected. Indicating letters, D and E, shown in Figs. 1 and 25, are provided to show the position selected relative to the feeds and threads obtained as shown on the index plate 277. These positions are shown in column 336 of the index plate 277.

It can thus be seen from the above description that we have provided a feed box transmission of compact design, with a very wide range of feeds and threads, and which has a system of control levers simple and easy to operate and conveniently located for the operator in close association with the control means for the headstock. It is unnecessary for the operator to bend over in order to read the index plate or make the necessary manipulations of the control levers of the feed box as has hitherto been necessary.

The driving power from the feed box 8 to the carriage control box 9 is transmitted through a series of conveniently located change gears (Fig. 28) at the left hand end of the lathe. This drive comprises the helical change gear 337 which is removably mounted by a suitable splined driving connection 338 and is securely held in place by the nut 339 threaded to the end of the output shaft 289. In Fig. 28, the standard change gear transmission from the feed box 8 to the carriage control box 9 is illustrated. This consists of the helical change gear 337 on the output shaft of the feed box 8, driving the helical idler gear 340 removably mounted on the stud 341 adjustably secured to the quadrant 342. This idler gear 340, in turn drives a gear 343 of the same size and number of teeth as the gear 337 and removably mounted on the drive shaft 344 by means of the nut 345 in the same manner provided for mounting the gear 337. The quadrant is supported and clamped by suitable bolts 346 passing through elongated holes 347 in flanged portions 348 of the control box 9, so that various sized change gears can be applied to the feed box output shaft 289, the control box drive shaft 344, and the quadrant stud 341. A suitable cover 349 having a removable cover plate 350 protects and encloses the gearing and permits easy access to the gears when applying various arrangements.

The gearing shown in Fig. 28 is the standard arrangement utilized in operating the lathe in low back gear, high back gear, and high spindle speed when it is desired to obtain the standard ranges of feeds and threads for use with these spindle speeds. When it is desired to obtain metric threads and feeds the usual metric transposing gear transmission may be substituted for the gears 337, 340, and 343 shown in Fig. 28.

The gears 337, 340, and 343 are made with helical teeth and of relatively wide face to insure quiet running and long life. The wide faces also permit applying compound gears of normal width of face to the quadrant stud 341. Any desired odd feed and lead of thread may be obtained with this lathe by merely applying the proper gearing in place of the gears 337, 340 and 343.

Relieving attachment driving mechanism

Through the medium of our novel headstock and feed box transmission described above, we are able to provide a unique driving mechanism for operating a relieving attachment. This driving arrangement can be attached to the lathe and adjusted more conveniently, and is of a much more simplified construction than the more conventional driving mechanism necessary to operating relieving attachments for lathes.

Referring particularly to Figs. 1, 23, 24, 25, and 26, we here illustrate the novel driving mechanism adapted to driving a relieving attachment, as for example the relieving attachments described in Patent No. 980,975, issued January 10, 1911, and in Patent No. 1,596,827, issued August 17, 1926. The drive shaft 216 of the feed box 8 has a splined extension 351 to which may be applied a change gear 352 removably secured in place on the shaft 216 by means of the nut 353 threaded to the shaft. In the normal operation of the lathe, when no relieving attachment is being used, the change gear 352 and nut 353 are removed from the shaft 216, and a suitable protective closure cap 354, Figs. 1 and 23, is placed over the end of the shaft, the cap being secured in the threaded bore 355 in the bearing retainer 221.

On the front wall 314 of the feed box 8 there is provided a machined mounting surface 356 having a keyway 357 and tapped holes 358. On this surface 356 a bracket 359 is mounted and secured thereto by suitable bolts 360 fitting in the tapped holes 358. A tongue 361 formed on the bracket 359 and fitting snugly in the keyway 357 serves automatically properly to align the bracket with a minimum of effort upon the part of the operator. In the bracket 359 there is fixed a bearing bushing 362 having a projecting portion 363 adapted to support the quadrant 364. The quadrant has adjustable clamping screws 365 cooperating with the flange 366 of the bracket 359, a similar arrangement to that shown in Fig. 28 relative to the quadrant 342. Rotatably journaled in the bearing bushing 362 is the relieving attachment drive shaft 367. Axial movement in the shaft 367 is prevented by contact of the shoulder 368 of the shaft and the face 369 of the universal joint 370, fixed to the right hand end of the shaft, which contact the respective end faces of the bearing bushing 367. On the left hand end of the shaft 367 there is provided the splined connection 371 and nut 372 for mounting a change gear 373. The splined connection 371 is of the same dimensions as the splined connection 351 of the shaft 216 so that change gears may be applied interchangeably to either of the shafts 216 and 367. A quadrant stud 374 having the mounting nut 375 is adapted for mounting compound change gears 376 and 377 in a like manner on the stud 341 of the quadrant 342, shown in Fig. 28. Fixed to the universal joint 370 is the usual telescoping driving tube 378 having a key 379 fixed in its bore and adapted slidingly to engage the keyway 380 of the drive rod 381 as is usual for relieving attachment drives and as illustrated in Patents No. 980,975 and No. 1,596,827.

When using the relieving attachment the lever 136 is adjusted so that the dial 138 will indicate position D, "Lead cutting, relieving" which will arrange the headstock transmission as shown in Fig. 10. Under these conditions the feed box transmission including the shaft 216 will be rotated at five times the speed of the headstock spindle, as already described. This speed-up of the shaft 216 produces the necessary speeds for the relieving attachment change gear transmission comprising change gears 352, 376, 377, and 373. It permits an easy drive through these gears and permits these gears to be of simple arrangement without the necessity of providing a relatively large speed-up in this change gear transmission. The number of gears and necessary changes for the relieving attachment change gear drive is thereby greatly reduced and simplified for the operator.

Since the entire feed box transmission is running five times as fast, relative to the spindle speed, when the relieving attachment is being used, the one-to-one change gear drive, comprising the gears 337, 340, and 343 as shown in Fig. 28, produces feeds and threads which will be five times the standard feeds and threads indicated on the index plate.

Should it be desired to have standard feeds and threads when using the relieving attachment it is only necessary to replace the standard change gears 337, 340, and 343 with a speed reducing gear train which will again bring the speed of the control box drive shaft 344 to standard speeds relative to the spindle speeds. For example, Fig. 26, in the particular lathe here illustrated a five-to-one reduction gearing, comprising the fifty-tooth gear 382 mounted on the output shaft 289, the compound gear comprising the hundred-tooth gear 383 and forty-tooth gear 384, and the hundred-tooth gear 344a mounted on the drive shaft 344 of the control box 9, are utilized to obtain standard feeds and threads as indicated on the index plate when using the relieving attachment.

It can thus be seen from the above description that we have provided a relieving attachment drive, mounted on the feed box and driving directly from the feed box transmission, which is of simple arrangement and easy to install on the lathe.

Carriage control box

Referring particularly to Figs. 1, 27 and 28, the drive shaft 344 is journaled in the bore 385 of the control box 9 on the anti-friction bearings 386 and 387. Projecting outward from the bearing 387 the shaft 344 has a splined extension 388 upon which is slidingly mounted a clutch gear 389. In the bore 390 in the end of lead screw 391 there is securely fixed a driving clutch member 392 which member also securely holds an anti-friction bearing 393 on the end of the lead screw 391. The bearing 393 is secured in the bore 394 of the control box 9 so that the lead screw 391 and clutch member 392 will have their axes coinciding with the axis of the drive shaft 344.

Directly below the lead screw 391 the feed rod 395 is journaled in the bearing bushing 396 fixed in the control box 9 and having the driving gear 397 fixed to its inner end projecting from the bearing 396. The clutch gear 389, when shifted to the left, Fig. 28, causes its integral gear 398 to engage and drive the gear 397 on the feed rod 395. When the clutch gear 389 is shifted to the right the gears 397 and 398 will be disengaged and the clutch teeth 399 and 400 will engage so that the lead screw 391 will be driven directly from the drive shaft 344.

A control lever 401, Figs. 1 and 27, mounted on the front of the control box 9, convenient for the operator, is fixed to a rock shaft 402 which has a disc 403 formed on its inner end. A pin 404, fixed eccentrically of the disc 403, engages in the annular slot 405 of the clutch gear 389 so that as the handle is moved to the right or left the lead screw 391 or feed rod 395 may be alternately driven by the drive shaft 344. It is to be noted that by this arrangement the feed rod and lead screw cannot be operated simultaneously and therefore one or the other are not running idle when not in use as in former constructions. It is also to be noted that the lead screw 391 is adapted to be driven directly from the helical gear driven shaft 344 which arrangement provides a smooth, powerful drive to the lead screw for accurate and smooth thread cutting.

Located directly below the feed rod 395 and parallel thereto is the rapid traverse rod 406 fixed to the end of the worm wheel shaft 407 by a suitable connection 408. The worm wheel shaft 407 is journaled in anti-friction bearings 409 and 410 mounted in the control box 9 and has fixed to it, intermediate the bearings, a worm wheel 411. A worm shaft 412 located at right angles to the shaft 407 and journaled on anti-friction bearings 413 and 414 has an integral worm 415 adapted to engage and drive the worm wheel 411.

The constant speed rapid traverse motor 416 located in the cavity 417 and fixed to a bracket 418 bolted to the bed 1 of the lathe, is connected to the worm shaft 412 by means of a suitable power transmission shaft 419 extending transversely through the bed 1. The rapid traverse motor 416 is arranged to operate constantly, by suitable electrical means, not shown, whenever the lathe is being operated, regardless of whether the main drive motor, located in the leg 2 of the lathe, is running or not running. Power take-off from the rapid traverse rod 46 will therefore be available at all times during the operation of the lathe. Should a friction stop, brake, and reverse mechanism be used, the shaft 419 would then be driven directly from the main driving motor for the headstock transmission as is usual for lathes.

Feed stop and reverse mechanism

We have provided a completely enclosed and simplified mechanism for stopping and reversing the feed to the carriage by a manipulating lever located on the apron 7. More particularly, in the control box 9, Figs. 27, 28, and 29, the feed control rod 420 is journaled immediately below and parallel with the rapid traverse rod 406 for both rotary and axial movements in the bearings 421 and 422. Intermediate the bearings 421 and 422 and adjacent the bearing 421 there is fixed a split collar 423 secured to the rod 420 by a suitable bolt 424 extending diametrically through the collar and shaft. On the lower projection of the bolt 424 is mounted a roller 425 adapted to engage in a slot 426 formed in the upper end 427 of the cam member 428. The cam 428 is mounted in the bore 429 extending vertically through the bottom of the control box 9 and secured therein by suitable screws 430. The slot 426 is usually positioned at a substantial angle to the axis of the control rod 420. It can be seen by this arrangement that when the rod 420 is rotated through a small arc the operation of the roller 425 in the slot 426 will cause the rod to be moved axially in either direction depending upon the direction of rotation of the shaft. Also, by this arrangement, if the rod 420 is moved axially in either direction it will be correspondingly rotated in either direction through a small arc. The effect of the roller 425 in the slot 426 is to produce combined rotary and axial motions in the control rod 420 with high efficiency and a minimum of friction loss.

A shifter member comprising the lever 431 having the forked yoke 432 adapted to engage around the feed reversing clutch 115, for axial shifting thereof, is pivotally mounted by its hub 433 on the shaft 434 fixed in the bed 1 of the lathe. A lever 435 depending from the hub 433 has mounted in its lower end 436 a stud 437 secured therein by means of the nut 438 and having a projection 439 adapted slidingly to engage in a tangential slot 440 formed in the collar 423. Set screws 441 and 442 threaded in lower portion 436 of the lever 435 provide means for adjusting the stud 437 in the elongated hole 443 axially of the rod 420, the purpose of which arrangement is to facilitate proper positioning of the shifter levers 431 and 435 relative to the clutch 115 and the collar 423 on the rod 420 when assembling the apparatus described. It is to be noted that axial movement of the shaft 420 through the levers 435 and 431 will impart opposite axial movement to the clutch 115. It is further to be noted that the effect of the projection 439 operating in the slot 440 is to allow free rotary movement of the rod 420 while at the same time imparting the axial motion of the rod 420 to the lever 435 as described.

The rod 420, Fig. 1, extending from the control box 9 longitudinally of the bed 1 in a conventional manner, is supported in the bearing box 444 fixed to the tailstock end of the bed and in a suitable bearing 445 in the depending boss 446 formed integral with the apron 7. The feed stop and reverse control lever 447, Figs. 1, 30, 31, 32, and 34, is journaled in the integral boss 448 and arranged so as to have substantially no axial movement therein. The lever has an axial bore 449 adapted to receive the rod 420 to which is fixed the key 450 adapted slidingly to engage the keyway 451 formed longitudinally through the length of apron travel of the rod 420. It can thus be seen that no matter what longitudinal position is selected for the apron along the bed, the control lever at all times can be raised or lowered to rock the rod 420 in either direction for reversing or stopping the feed through the mechanism already described.

Means for stopping the longitudinal feed by motion of the apron along the bed comprises providing suitable axially adjustable trip dogs 452, Fig. 1, secured to the rod 420 which are engaged by the surfaces 453 of the boss 446 and the surface 454 of the control lever 447 as the apron moves longitudinally of the bed whereby to move the rod axially to move the clutch 115 to neutral position through the mechanism described.

In order to facilitate locating the feed positions and intermediate neutral position of the rod 420 when manipulated by the lever 447 and to hold the rod in the position selected by the lever or by movement of the rod by contact of the apron with the trip dogs 452 as described, a detent arrangement, Figs. 27, 28, and 29, is provided for the rod 420. Intermediate the bearings 421 and 422 of the rod 420 in the control box 9 and adjacent the bearing 422 there is fixed to the rod 420 a radially extending lug 455 having arcuate detents 456 corresponding to the feed and neutral positions of the rod 420 formed circumferentially of its outer end. A roller 457 is journaled in the end of a suitable lever 458 which is pivotally mounted on the lug 459 formed integral with the control box 9. A tension spring 460 connected to an extension 461 of the lever 458 beyond its pivotal mounting 459 and fixed to the bed 1 of the lathe, provides means for yieldingly urging the lever 458 and roller 457 into the respective detents 456 when the rod 420 is shifted.

*Apron rapid traverse mechanism*

Referring particularly to Figs. 31, 33, and 33a, the lathe apron 7 has the usual half nuts 462 and 463 adapted to engage the lead screw 391 when thread cutting operations are being performed. These half nuts are operated by the usual scroll cam 464 to which the operating handle 465 is attached, substantially as disclosed in Patent No. 980,971, issued January 10, 1911.

We provide in this lathe apron a mechanism for operatively connecting either the cross-feeding mechanism or longitudinal-feeding mechanism with the driving means of the lathe, of a character substantially as described and claimed in Patent No. 1,944,231, issued January 23, 1934. The driving power for operating the cross and longitudinal feeding mechanism is derived from the feed rod 395 which is driven from the main driving motor for the lathe by the mechanism already described.

In an integral boss 466, Fig. 31, there is rotatably mounted the bevel gear 467, having a splined bore into which the feed rod 395 slidingly engages so that the bevel gear 467 may be rotated by the rod 395 at all times whether the apron 7 is stationary or is feeding longitudinally. Noting particularly Fig. 3, the bevel gear 467 is adapted to drive a mating bevel gear 468 mounted on the shaft 469 journaled, perpendicular to the feed rod 395, in suitable bearings 470 and 471 formed in the front wall 472 and rear wall 473 respectively of the apron 7. Intermediate the bearings 470 and 471 a driving pinion 474 is fixed on the shaft 469 and is adapted to drive the shiftable middle gear 475, Fig. 31, which is securely keyed and pinned to the shifter shaft 476. This shaft is journaled for both axial and rotary movements in suitable bearings 477 and 478 provided in the respective walls 472 and 473 of the apron 7. To the front of the shiftable gear 475 the front outer gear 479 is rotatably journaled on the shifter shaft 476 and is adapted to drive the cross feed screw 480 through the idler gear 481 suitably journaled in the carriage 6. This idler in turn meshes with the cross feed screw pinion 482, Figs. 3 and 30.

To the rear of the shiftable gear 475, there is rotatably journaled on the shifter shaft 476 the rear outer gear 483, which is adapted to drive the gear 484 mounted by slidable splined connection 485 on the rack pinion shaft 486. A feed control handle 487 is utilized for selecting and disengaging the cross or longitudinal feeding by axially moving the shifter shaft 476 in a manner fully disclosed in Patent No. 1,944,231. Interlocking means (not shown) between this mechanism and the mechanism for operating the half-nuts is provided substantially as shown in Patent No. 1,944,231.

The splined rack pinion shaft 486, Figs. 31 and 35, is journaled in a suitable bearing 488 in the front wall 472 of the apron and is supported in an anti-friction bearing 489 in the rear wall 473.

The inner race of the bearing 489 is secured to the shaft 486 by a suitable nut 490 which holds the bearing firmly against the integral rack pinion 491 formed on the shaft 486. The outer race of the anti-friction bearing 489 is adapted for axial movement in the bore 492 in the rear wall 473 and in a mating bore 493 in the gear 484. The shaft is also adapted for axial movement in the bearing 488. A pull knob 494 is fixed to the front end of the shaft 486 to facilitate manual movement of the rack pinion shaft 486, axially. The purpose of this is to enable the operator of the lathe to withdraw the rack pinion 491 from the rack 495 fixed to the bed 1 when using the lead screw and half-nuts in thread chasing. This arrangement thereby avoids the necessity of driving the various gear trains of the apron through the rack 495 and pinion 491 when the apron is being moved by the lead screw. Hence we prevent inaccuracies in the thread chasing and excessive wear of the lead screw and half-nuts.

The usual handwheel 496 for manual longitudinal feeding of the carriage is fixed on the handwheel shaft 497. This shaft is journaled in an anti-friction bearing 498 mounted in the rear wall 473 of the apron and in an anti-friction bearing 499 mounted in a bracket 500 secured to the front of the apron wall 472 by suitable screws 501. Between the bearings 498 and 499 and adjacent the bearing 498 there is formed the integral drive pinion 502 of the shaft 497, which is adapted to engage and drive the gear 484, so that the rack pinion 491 may be rotated by the handwheel 496 whereby to move the carriage longitudinally substantially as shown in Patent 1,944,231.

We have provided in addition to the apron mechanism described above, a novel mechanism to produce longitudinal and cross rapid traverse motions in either direction. We have further provided a novel single lever control for quickly and easily selecting the various rapid traverse motions. The main source of driving power for the apron rapid traverse mechanism in the particular lathe here shown is derived from the rapid traverse rod 406 which is driven at constant speed at all times during the operation of the lathe.

Figure 30:
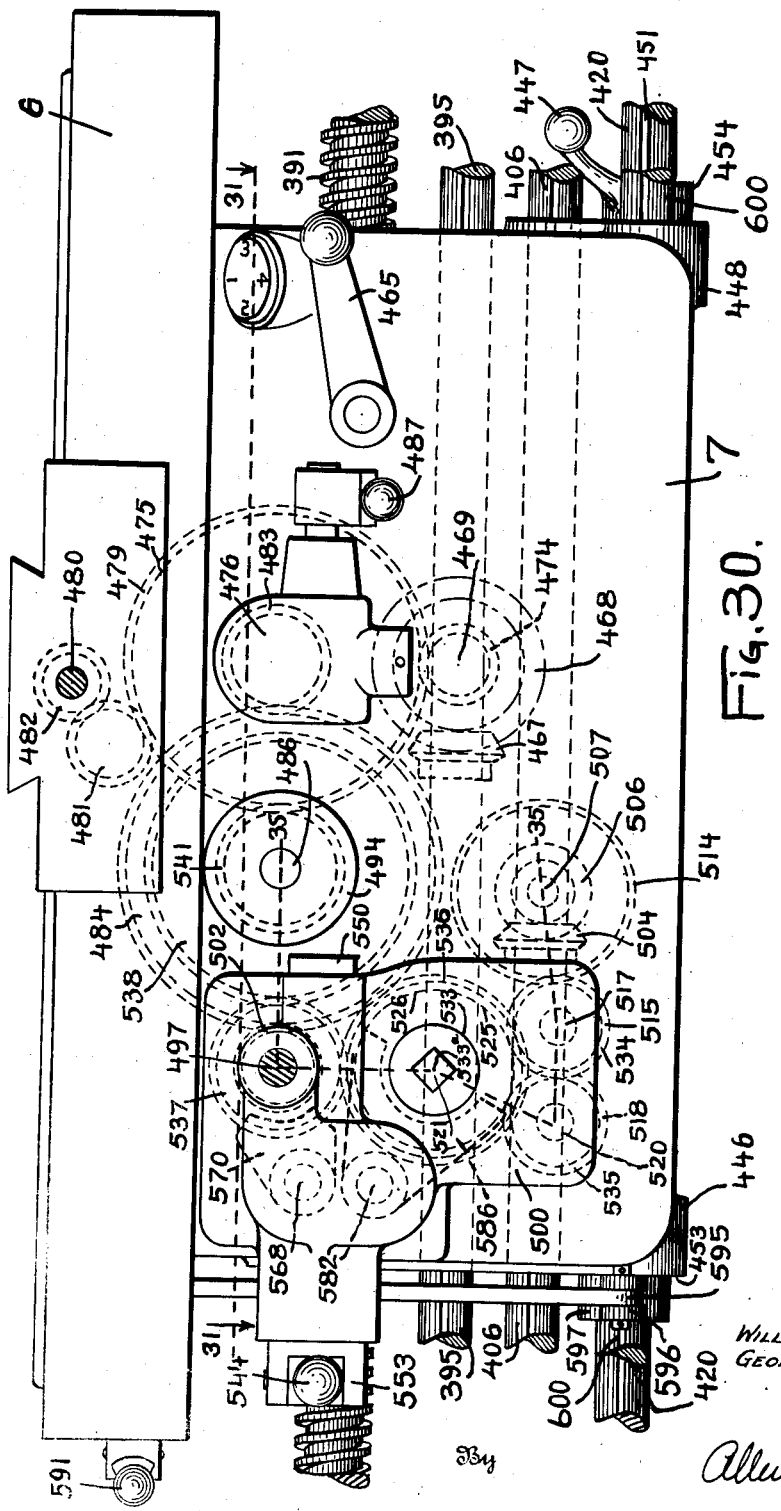
Fig. 30 is a front elevation of the lathe apron showing the various gear trains for operating the feed and traverse mechanisms.

In the boss 503, Figs. 30, 31 and 35, the bevel gear 504 is journaled in a suitable bearing 505 adapted to prevent axial movement of the bevel gear 504. The bevel gear 504 has a splined bore into which the rapid traverse rod 406 slidingly engages, so that the bevel gear 504 may be rotated by the rapid traverse rod 406 at all times whether the apron is stationary or is feeding longitudinally. A mating bevel gear 506, adapted to be driven by the bevel gear 504, is formed integral with the shaft 507 which is journaled perpendicular to the rapid traverse rod 406 in suitable anti-friction bearings 508 and 509 which bearings in turn are mounted in the sleeve 510 secured in the rear wall 473 of the apron 7 by a suitable bolt 511. Mounted on the inner end of the shaft 507 and secured and held in driving relation thereon by means of the key 512 and lock nut 513 is a gear 514 adapted to engage and drive the gear 515 of the compound gear 516, the compound gear being rotatably journaled on the shaft 517 fixed in the front wall 472 and rear wall 473 of the apron 7, Figs. 35 and 36. The gear 515 also engages the gear 518 of the compound gear 519 which is journaled on the shaft 520 fixed in the front wall 472 and rear wall 473 of the apron.

The traverse reverse and forward friction clutch assemblies are mounted on the shaft 521 which is journaled in the anti-friction bearing 522 mounted in the rear wall 473 and in the anti-friction bearing 523 slidably mounted in the bracket 500 on the front wall of the apron 7. The portion of the shaft 521 intermediate these bearings is provided with splines 521a upon which are mounted the clutch assemblies comprising the hardened steel plates 524, fitting in driving relation but adapted to axial movement on the splines 521a; the driving gears 525 and 526 which have sleeves 527 fixed in their axial bores so that the gears 525 and 526 may revolve freely on their sleeves 527 upon the periphery of the shaft 521; hardened steel discs 528 rotatably mounted on projections of the sleeves 527 and adjacent the faces of the gears 525 and 526; and suitable composition friction discs 529, also rotatably mounted on projections of the sleeve 527, are located between the various pairs of steel discs 524 and 529. Between these clutch assemblies is mounted, on the splines 521a, the clutch operating member 530 adapted to axial movement on the splines of the shaft 521. Suitable thrust collars 531 and 532 adjacent the respective bearings 522 and 523 provide means for properly confining the clutch assemblies and operating member 530 between the bearings 522 and 523. An adjustable bearing retainer 533 having a squared portion 533a adapted to receive a suitable wrench, threaded in the bracket 500, provides easily accessible means for adjusting the bearing 523 axially of the shaft 526 for the purpose of properly setting the relative position of the clutch plates for proper driving engagement. It can thus be seen that as the clutch operating member 530 is urged axially toward the rear of the apron, the normally loose running gear 525 will be clamped between the respective clutch plates 524, 528, and 529, in driving engagement with the shaft 521. Likewise the gear 526 may be engaged in driving relation with the shaft 521 when member 530 is urged to the front of the apron.

The gear 525 is driven from the compound gear 516 by means of the gear 534; and the gear 526 is driven from the compound gear 519 by means of gear 535. The compound gears 516 and 519 are kept properly axially positioned upon their respective fixed shafts 517 and 520 by contact of the sides of the teeth of the gears 534 and 535 with the hardened steel plates 528 adjacent the corresponding meshing gears 525 and 526. It can therefore be seen that since the shaft 507 rotates at constant speed, in the same direction by the means described, rotation of the gear 525 will therefore be produced through the three gears 514, 515, and 534, while rotation of gear 526 will be produced through the four gears 514, 515, 518 and 535. It thus follows that the gears 525 and 526 rotate in opposite directions and that by alternately engaging one or the other clutch assemblies by the appropriate axial movement of the member 530, corresponding directions of rotation in either direction can be produced in the shaft 521 and member 530.

The mechanism for alternately connecting the above forward and reverse rapid traverse driving power to the longitudinal and cross travel of the carriage and cross slide comprises the gear 536 formed integral with the member 530 which is adapted for driving engagement with the axially slidable clutch gear 537 journaled for free rotation on the handwheel shaft 497, Figs. 30, 31, 35, 36, and 38. When shifted axially toward the front of the apron, the gear 537, which is at all times in driving engagement with the gear 536, meshes with a gear 538 of the compound gear 539 which compound gear is journaled for free rotation upon a suitable extension 540 of the hub of the gear 484. The gear 541 of the compound gear 539 in turn is connected in driving relation with the gear 479, Figs. 30 and 31, which drives the cross feed mechanism as described.

The gear 537 has an internal clutch 542 adapted to engage over a portion 543 of the pinion 502 whereby to provide a positive driving connection between the gear 537 and pinion 502 so as to impart longitudinal rapid traverse movements to the carriage through the gear 484 and rack pinion 491 as described. It can thus be seen from the above description that the gear 537 can be caused to rotate at rapid traverse speeds in either direction through the forward and reverse clutch assemblies described, and that when the gear 537 is shifted toward the front of the apron, rapid traverse may be applied in either direction to the cross slide and when the gear 537 is shifted toward the rear of the apron, rapid traverse may be provided to longitudinal movement of the carriage in either direction.

We have provided a novel single lever control mechanism for alternately applying rapid traverse motions in either direction to the longitudinal and cross travel of the carriage and cross slide. Referring particularly to Figs. 1, 2 and 30 through 41, the rapid traverse control lever 544 is conveniently located on the left hand end of the apron 7 directly to the left of the handwheel 496, Fig. 1. In the bracket 500 is mounted the rock shaft 545 having a large diameter 546 rotatably fitting in the large bore 547 and a smaller diameter 548 rotatably fitting in the small bore 549. A suitable thrust collar 550 is fixed to the outer end of the small diameter 548 to prevent axial movement of the rock shaft 545 by confining the shaft 545 between face 551 of the large diameter 546 and the inner face 552 of the collar 550. These faces contact appropriate faces of the bracket 500 adjacent the bores 547 and 549.

The left hand end, Figs. 38 and 40, of the rock shaft 545 comprises a bifurcated portion 553 having a transverse slot formed therein by the faces 554, 555, and 556. The control handle 544 has a squared portion 557 which is adapted to fit nicely between the faces 554 and 555 and is pivotally mounted on the pin 558 passing diametrically through the portion 553 perpendicular to the faces 554 and 555. The purpose of this arrangement is to permit horizontal movement of of the handle 554 substantially parallel to the axis of the rock shaft 545. It is also to be noted that the handle 544 may be moved up and down in a vertical plane as it is confined between the faces 554 and 555. This causes rotation of the rock shaft 545 in the bracket 500.

In the large diameter 545 is formed a tangential transverse slot comprising the faces 559, 560, and 561. Extending axially to the right, Figs. 38 and 40, from the face 556 in the rock shaft 545, is a relatively large bore 562 having a depth indicated by the line 563 which thereby causes this bore 562 to break into the transverse slot in the large diameter 546 and form a passageway 564 from the bore 562 into the transverse slot. Formed integral with the squared portion 557 of the control handle 544 is a lever arm 565 extending to the right, Figs. 38 and 40, substantially on the axis of rotation of the rock shaft 545, through the bore 562 and passageway 564 in to the transverse slot formed in the large diameter 546. The arm 565 has a rounded end 566 adapted to engage in an appropriate slot 567 formed in the shifter rod 568 which is mounted in the front wall 472 and rear wall 473 for axial movement in the respective bores 569 and 569a of the walls of the apron 7. A shifter yoke 570 fixed on the rod 568 intermediate the bores 569 and 569a, by a suitable pin 571 engages the annular slot 572 of the gear 537 so that axial motion of the rod 568 will cause corresponding axial shifting of the gear 537 on the shaft 497. It can thus be seen, Fig. 38, that horizontal movement of the control handle 544 will cause the arm 565 to move so as to move the rod 568 axially, and thereby shift the gear 537. Thus, when the lever 544 is shifted horizontally to the left to position 573, the gear 537 will be shifted into mesh with gear 538 thereby connecting the rapid traverse power to the cross feed mechanism as described. Likewise, when the control handle is moved to the right to position 574, the internal clutch 542 of gear 537 engages with the pinion 502 to connect the rapid traverse power to the longitudinal feeding mechanism as described.

In order conveniently and automatically to hold the control handle 544 in the respective selected positions 573 and 574, a detent is provided comprising a pin 575 fixed on the lower side of the arm 565, adjacent but not contacting the bottom 563 of the bore 562. Carried in the longitudinal bore 576 in the rock shaft 545 is a plunger 577 yieldingly urged toward the pin 575 by a suitable compression spring 578. With this arrangement the tendency is for the plunger to "ride off" to either side of the pin 575 so as to hold the handle in either of the positions 573 and 574 selected by the operator.

Located on the under side of the large diameter 546 of the rock shaft 545 is a segmental gear 579 adapted to engage a rack 580 cut in the squared end 581 in the forward and reverse clutch shifter rod 582. The rod 582 is mounted in suitable bores 583 and 584 for axial movement in the respective walls 472 and 473 of the apron 7. Fixed to the rod 582, intermediate the bores 583 and 584, by means of a suitable pin 585 is a shifter yoke 586 adapted to engage the outer race of an anti-friction bearing 587, which bearing has its inner race secured to the member 530, the result being that axial shifting of the rod 582 will cause axial shifting of the member 530 for engaging the forward and reverse clutch assemblies as described. It can thus be seen that vertical movement of the handle 544, Fig. 41, will cause the segmental gear 579 to move the rack 580 and thereby move the rod 582 axially to shift the member 530. It is to be noted that when the lever 544 is held in the upper position 588, the rod 582 will be moved toward the front of the apron so that the clutch assembly, driven by gear 526, will be engaged. When the lever 544 is held in the lower position 589 the rod 582 will be moved toward the rear of the apron so as to engage the clutch assembly driven by the gear 525. It is to be further noted that since the end 566 of the arm 565 is located substantially on the axis of rotation of the rock shaft 545, no displacement of rod 567 results when vertical motion is imparted to the lever 544 so that reversing of the rapid traverse movement has no effect on whether the cross or longitudinal rapid traverse movements have been selected. Furthermore, this mechanism is so arranged that no damage can result from improper operation of the apron on the part of the operator. For instance, should either the cross or longitudinal feed be engaged or the half-nuts be clamped on the lead screw, engagement of any of the rapid traverse motions will do no harm since, by this arrangement, the clutch assemblies can be so proportioned as to easily drive the normal traverse motions but to slip when such undue strains as those noted above may occur. Likewise, with this rapid traverse arrangement, the carriage may be traversed at full speed into the headstock or tailstock or the cross slide run the full length of its travel in either direction without damage to any part of the lathe. A conveniently located indicating dial 590 is provided on the bracket 500 adjacent the rapid traverse handle 544 to facilitate selecting the proper traverse motion on the part of the operator.

This apron is also provided with the usual spindle control mechanism comprising the lever 591, Figs. 1, 2, 30, and 37, located on the left hand end of the carriage 6 on a suitable rock shaft 592 journaled in the carriage 6. The rock shaft 592 extends into a cavity 593 and has fixed on its inner end a lever 594 which lever is connected through a suitable link 595 to the lever arm 596 of the sleeve 597 pivotally mounted in the boss 446 of the apron 7. This sleeve 597, which is restricted so that is has substantially no axial movement in the boss 446, has a bore 598 with a key 599 fixed therein which slidingly engages the spindle control rod 600, extending longitudinally of the bed. The rod 600 is supported in suitable journals in the control box 9, the bearing box 144, and in bosses 446 and 448 of the apron. It can thus be clearly seen that manipulation of the spindle control lever 591 in a vertical plane will cause corresponding rocking of the rod 600 through the means described. Fixed to the rod 600 is a suitable lever 601 and linkage 602 which is operably connected to the electrical control mechanism, not shown, for the main driving motor mounted in the leg 2 of the lathe. In the event a friction clutch, brake, and reverse mechanism were to be used, this linkage would be adapted to operate such mechanism as is usual for lathes.

Having thus described our invention, what we claim as new and desire to secure by Letters Patent, is:

1. In a lathe headstock, the combination of a spindle, a back gear shaft, and a drive shaft, a large gear fixed on the spindle, a smaller gear fixed on the spindle, a worm wheel rotatably mounted on said spindle, a compound back gear mounted on the back gear shaft adapted to be moved alternatively to engage one or the other of the gears on the spindle and to neutral position, a worm wheel fixed on the back gear shaft, worms fixed on the drive shaft engaging said worm wheels, means for connecting said first mentioned worm wheel to drive the spindle when the compound back gear is in neutral position, and means for driving said drive shaft.

2. In a lathe headstock, the combination of a spindle, a back gear shaft, a worm shaft, and a drive shaft, a large gear fixed on the spindle, a smaller gear fixed on the spindle, a worm wheel rotatably mounted on said spindle, a compound back gear mounted on said back gear shaft, means for moving said back gear alternatively to engage one or the other of the gears on the spindle and a neutral position, a worm wheel fixed on the back gear shaft, worms fixed on the worm shaft engaging said worm wheels, means for connecting said first mentioned worm wheel to drive the spindle when the compound back gear is in neutral position, a change speed transmission between the worm shaft and the drive shaft, and motive means for the drive shaft.

3. In a lathe headstock, the combination of a spindle, a back gear shaft, a feed drive shaft, and a worm drive shaft, worm wheels fixed on the spindle, back gear shaft, and feed drive shafts, respectively, worms fixed on the worm shaft engaging the worm wheels, and motive means for the worm drive shaft.

4. In a lathe headstock, the combination of a spindle, a feed drive shaft and a worm drive shaft, a worm wheel rotatably mounted on the spindle, a worm wheel rotatably mounted on the feed drive shaft, means for connecting and disconnecting said worm wheels for effecting driving and non-driving relation with the spindle and feed drive shaft, worms on the worm drive shaft engaging said worm wheels, and motive means for said worm shaft.

5. In a lathe headstock, the combination of a spindle, a feed drive shaft, and a worm drive shaft, a worm wheel rotatably mounted on the spindle, a worm wheel rotatably mounted on the feed drive shaft, means for connecting and disconnecting the worm wheels for effecting driving and non-driving relation with the spindle and feed drive shaft, direct driving means between the spindle and the feed drive shaft, worms on the drive shaft engaging said worm wheels, and motive means for said worm shaft.

6. In a lathe headstock, the combination of a spindle, a feed drive shaft, and a worm drive shaft, a worm wheel rotatably mounted on the spindle, a worm wheel rotatably mounted on the feed drive shaft, means for connecting and disconnecting the worm wheels for effecting driving and non-driving relation with the spindle and feed drive shaft, direct driving means between the spindle and the feed drive shaft, means for rendering the direct driving means effective when the worm wheels are disengaged from the spindle and feed drive shaft, worms on the worm drive shaft engaging said worm wheels, and motive means for said worm shaft.

7. In a lathe headstock transmission, mechanism operative to produce low back gear spindle speeds in combination with standard threads and feeds comprising a spindle, a worm driven back gear shaft, and a feed drive shaft, a relatively large gear mounted on the spindle, a relatively small pinion fixed to the back gear shaft and cooperating with the large gear, a driving connection between the spindle and the feed drive shaft, and motive means for the back gear shaft.

8. In a lathe headstock transmission, mechanism operative to produce high back gear spindle speeds in combination with standard threads and feeds comprising a spindle, a worm driven back gear shaft, and a feed drive shaft, a gear fixed on the spindle, a gear of substantially the same size and cooperating with said gear fixed on the back gear shaft, a driving connection between the spindle and the feed drive shaft, and motive means for the back gear shaft.

9. In a lathe headstock transmission, mechanism operative to produce low back gear spindle speeds in combination with coarse threads and feeds, comprising a spindle, a back gear shaft, a feed drive shaft, and a worm drive shaft, a relatively large gear fixed on the spindle, a relatively small pinion engaging the gear fixed on the back gear shaft, a worm wheel fixed on the back gear shaft, a worm wheel fixed on the feed drive shaft, worms on the worm shaft engaging said worm wheels, and motive means for the worm shaft.

10. A lathe headstock transmission, comprising a spindle, a back gear shaft, a feed drive shaft, and a worm drive shaft, large and small gears fixed on the spindle, a compound back gear mounted on the back gear shaft adapted to be moved alternatively to engage one or the other of the gears on the spindle and to a neutral position, a worm wheel fixed on the back gear shaft, a worm wheel rotatably mounted on the spindle, a worm wheel rotatably mounted on the feed drive shaft, means on the spindle and the feed drive shaft for engaging and disengaging said worm wheels on the spindle and feed drive shaft for driving and non-driving, said means providing a direct driving connection between the spindle and feed drive shaft when the worm wheels on the spindle and feed drive shaft are disengaged from driving relation, worms fixed on the worm shaft engaging the worm wheels, and motive means for the worm shaft.

11. A lathe headstock transmission comprising a spindle, a back gear shaft, a feed drive shaft, and a worm drive shaft, large and small gears fixed on the spindle, a compound back gear mounted on the back gear shaft adapted to be moved alternatively to engage one or the other of the gears on the spindle and to a neutral position, a worm wheel fixed on the back gear shaft, a worm wheel rotatably mounted on the spindle, a worm wheel rotatably mounted on the feed drive shaft, movable means on the spindle and the feed drive shaft for engaging and disengaging the said worm wheels for driving and non-driving, said means providing a direct driving connection between the spindle and feed drive shaft when the worm wheels on the spindle and feed drive shaft are disengaged from driving relation thereon, means for moving said compound back gear and means for engaging and disengaging the worm wheels on the spindle and feed drive shaft, worms fixed on the worm shaft engaging the worm wheels, and motive means for the worm shaft.

12. A lathe headstock transmission comprising a spindle, a back gear shaft, a feed drive shaft, and a worm drive shaft, large and small gears fixed on the spindle, a compound back gear mounted on the back gear shaft and adapted to be moved alternatively to engage one or the other of the gears on the spindle and to a neutral position, a worm wheel fixed on the back gear shaft, a worm wheel rotatably mounted on the spindle, a worm wheel rotatably mounted on the feed drive shaft, means on the spindle for connecting and disconnecting the worm wheel to the spindle for driving and non-driving relation therewith, means on the feed drive shaft for connecting and disconnecting the worm wheel on the feed drive shaft for driving and non-driving relation therewith, said connecting and disconnecting means on the spindle and feed drive shaft providing a direct driving connection between the spindle and feed drive shaft when the worm wheels mounted thereon are disconnected from driving relation, means for rendering the connecting and disconnecting means effective and for shifting said compound back gear, worms fixed on the worm drive shaft engaging said worm wheels, and motive means for the worm drive shaft.

13. In a lathe headstock change speed transmission, a spindle and associated rotatable and shiftable members, and means for shifting said members comprising a rotatable cam drum surrounding the spindle, means for supporting the cam drum independently of the spindle, cams on said cam drum, mechanism cooperating with said cams to shift said rotatable and shiftable members when the cam drum is rotated, and means for rotating said cam drum.

14. In a lathe headstock change speed transmission, a spindle and associated rotatable and shiftable members, and means for shifting said members comprising a rotatable cam drum surrounding said spindle, means for supporting said cam drum independently of said spindle, a detent means associated with the cam drum serving to hold it in proper locations selectively on said supporting means, cams on said cam drum, mechanism cooperating with said cams to shift said rotatable and shiftable members when the cam drum is rotated, and means for rotating said cam drum.

15. In a change speed transmission, a drive shaft and an output shaft, a pinion fixed on the drive shaft, a gear rotatable on the output shaft cooperating with the pinion, a small gear fixed on the drive shaft, a large gear fixed on the drive shaft, a sleeve rotatable on the output shaft, a compound gear having large and small gears alternately cooperating with the small and large gears mounted on the drive shaft, the compound gear being slidingly mounted upon and adapted to drive said sleeve, means providing a driving connection between said sleeve and said gear rotatably mounted on the output shaft, a pinion on said sleeve, a compound gear rotatably mounted on the drive shaft and comprising a large gear cooperating with the pinion on the sleeve and a small gear, and a gear slidingly mounted upon and adapted to drive said output shaft, said last mentioned gear adapted alternately to connect said sleeve in driving relation with said output shaft and to cooperate with said small gear of said compound gear rotatably mounted on the drive shaft.

16. In a change speed transmission as set forth in claim 15, means for sliding the compound gear on the sleeve and said gear slidingly mounted on said output shaft.

17. A lathe having in combination a bed, a headstock, a feed box mounted on the headstock, a transmission in said headstock, a transmission in said feed box, a driving connection between said headstock transmission and said feed box transmission, a control box mounted on said bed, a tool carriage mounted on said bed, power transmission mechanism in said control box, a driving connection between said control box transmission and said tool carriage, and change gear transmission mechanism connecting said feed box transmission to said control box transmission.

18. A lathe having in combination a headstock, a feed box mounted on the headstock, a transmission in the headstock, a transmission in the feed box, a driving connection between said headstock transmission and said feed box transmission, mounting means on said feed box for a relieving attachment drive mechanism, and a driving connection effective between said feed box transmission and said relieving attachment drive mechanism.

19. A lathe having in combination a headstock, a feed box mounted on said headstock, a transmission in said headstock, a transmission in said feed box, a reversible driving connection between said headstock transmission and said feed box transmission, mounting means on said feed box for a relieving attachment drive mechanism, and a driving connection effective between the feed box transmission and said relieving attachment drive mechanism.

20. A lathe having in combination a headstock, a carriage transmission in the headstock, a feed box, a transmission in the feed box having a drive shaft and an output shaft, a driving connection between said headstock transmission and the drive shaft, means on said drive shaft for driving a relieving attachment, and means cooperating with said output shaft to actuate said lathe carriage.

21. A lathe having in combination a headstock, a carriage, a transmission in said headstock, a feed box, a transmission in said feed box comprising a drive shaft, an intermediate shaft, and an output shaft, means for driving said drive shaft from said headstock transmission, means for driving said carriage from said output shaft, means for driving a relieving attachment, and change gear transmission means between said drive shaft and said driving means for the relieving attachment.

22. A lathe having in combination a headstock, a carriage, a transmission in said headstock, a feed box, a transmission in said feed box having a drive shaft, an intermediate shaft, and an output shaft, driving means for said lathe carriage, change gear transmission means connecting said output shaft to said driving means for the carriage, a relieving attachment mounted on said carriage, driving means for said relieving attachment mounted on said feed box, and change gear transmission means connecting said drive shaft to said driving means for the relieving attachment.

23. In a lathe having a bed, a control mechanism for the lathe carriage comprising a control box mounted on the bed, a drive shaft mounted in said control box, a lead screw supported in said control box coaxial with said drive shaft, a feed rod supported in said control box, means on said drive shaft alternately to connect said drive shaft to said lead screw, and manual means for actuating said first mentioned means.

24. In a lathe having a bed and a carriage, a control mechanism for said lathe carriage comprising a control box mounted on said bed, a drive shaft mounted in said control box, a lead screw supported in said control box and coaxial with said drive shaft, a feed rod supported in said control box, means on said drive shaft alternately to connect said drive shaft to said lead screw, manual means for actuating said first mentioned means, a rapid traverse rod mounted in said feed box and associated with said lead screw and said feed rod, and motive means located in the bed of said lathe for rotating said rapid traverse rod constantly at relatively high speed.

25. In a lathe, a bed, a headstock mounted on the bed, a control box mounted on said bed, and a tool carriage mounted for longitudinal movement on said bed, feed reverse mechanism comprising a reversible driving connection between the headstock transmission and feed mechanism, reversing means for the driving connection, a control rod supported in the control box and tool carriage and having both axial and rotary movements, a control handle on the tool carriage for actuating the control rod, means in the control box for imparting combined axial and rotary movements to the rod when actuated, and mechanism cooperating with the control rod for actuating the reversing means for the reversible driving connection.

26. In a lathe, a bed, a headstock mounted on said bed, a control box mounted on said bed, and a tool carriage mounted for longitudinal movement on said bed, feed reverse and stop mechanism comprising a reversible driving connection between the headstock transmission and feed mechanism, reversing means having a neutral position for the driving connection, a control rod supported in the control box and tool carriage and having both axial and rotary movements, a control handle for rotating the control rod, means on the rod actuated by the movement of the tool carriage to impart axial movement to the control rod, means in the control box to cause rotary and axial movement of the control rod to take place simultaneously, and mechanism cooperating with the control rod for actuating the reversing means for the reversible driving connection.

27. The combination set forth in claim 26, wherein the last mentioned mechanism comprises a lever pivotally mounted intermediate its ends in the bed of the lathe, a projection on one end of the lever, means on the control rod engaging the projection so that axial movement of the rod causes pivotal movement of the lever, and means on the other end of the lever for actuating the reversing means.

28. The combination set forth in claim 26, wherein the last mentioned mechanism comprises a lever pivotally mounted intermediate its ends in the bed of the lathe, a projection on one end of the lever, means on the control rod engaging the projection so that axial movement of the rod causes pivotal movement of the lever, means on the other end of the lever for actuating the reversing means, and detent means associated with the control rod for yieldingly holding the feed reverse and stop mechanism in reversing and neutral positions.

WILLIAM F. GROENE.
GEORGE W. LUNING.